(12) United States Patent
Takai et al.

(10) Patent No.: US 9,505,231 B2
(45) Date of Patent: Nov. 29, 2016

(54) SYSTEM FOR PRINTING ON THREE-DIMENSIONAL OBJECT AND NON-TRANSITORY COMPUTER READABLE MEDIUM STORED WITH PROGRAM FOR PRINTING ON THREE-DIMENSIONAL OBJECT

(71) Applicant: MIMAKI ENGINEERING CO., LTD., Nagano (JP)

(72) Inventors: Daisuke Takai, Nagano (JP); Wataru Hioki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/440,597

(22) PCT Filed: Nov. 15, 2013

(86) PCT No.: PCT/JP2013/080863
§ 371 (c)(1),
(2) Date: May 5, 2015

(87) PCT Pub. No.: WO2014/077348
PCT Pub. Date: May 22, 2014

(65) Prior Publication Data
US 2015/0283825 A1    Oct. 8, 2015

(30) Foreign Application Priority Data

Nov. 17, 2012 (JP) ................. 2012-252779

(51) Int. Cl.
*B41J 29/38* (2006.01)
*B41J 3/407* (2006.01)

(52) U.S. Cl.
CPC ............... *B41J 3/4073* (2013.01); *B41J 29/38* (2013.01)

(58) Field of Classification Search
CPC ........................................................ B41J 3/4073
USPC ................. 347/2–4, 14, 16, 105; 101/35
See application file for complete search history.

(56) References Cited

U.S. PATENT DOCUMENTS

| | | | |
|---|---|---|---|
| 6,360,656 B2 * | 3/2002 | Kubo | 101/35 |
| 8,511,782 B2 * | 8/2013 | Chang | B41J 3/4073 347/105 |
| 2010/0315459 A1 | 12/2010 | Chang et al. | |

FOREIGN PATENT DOCUMENTS

| | | |
|---|---|---|
| CN | 101954342 | 1/2011 |
| JP | 5-293955 | 11/1993 |

(Continued)

OTHER PUBLICATIONS

"International Search Report (Form PCT/ISA/210)", mailed on Jan. 7, 2014, with English translation thereof, pp. 1-4, in which six of the listed references (JP2011-20112, JP5-293955, JP2006-27225, JP2003-46762, JP2008-288807 and JP2009-56789) were cited.

(Continued)

*Primary Examiner* — Lam Nguyen
(74) *Attorney, Agent, or Firm* — Jianq Chyun IP Office

(57) ABSTRACT

A system for printing on a three-dimensional object includes: a recording head; a three-dimensional object supporting device supporting a three-dimensional object rotatively with a shaft member as a center; a print control section causing the recording head to print an image on the three-dimensional object while rotating the three-dimensional object by the three-dimensional object supporting device, and causing the three-dimensional object supporting device to support the three-dimensional object at a designated angle, for each of designated angles, and causing the recording head to print divided images on the three-dimensional object, the divided images being set with respect to the designated angles; an image accepting section that receives the print image; and an image dividing section that divides the print image received by the image accepting section in association with the designated angles to set the divided images to the designated angles.

9 Claims, 22 Drawing Sheets

(56) References Cited

FOREIGN PATENT DOCUMENTS

| | | |
|---|---|---|
| JP | 2003-46762 | 2/2003 |
| JP | 2006-27225 | 2/2006 |
| JP | 4041470 | 11/2007 |
| JP | 2008-288807 | 11/2008 |
| JP | 2009-56789 | 3/2009 |
| JP | 2011-20112 | 2/2011 |

OTHER PUBLICATIONS

"1st Office Action of China Counterpart Application", issued on Dec. 9, 2015, with English translation thereof, p. 1-p. 17.

"Office Action of Japan Counterpart Application" with English translation, issued on Jun. 21, 2016, p. 1-p. 6.

"Search Report of European Counterpart Application", issued on Jul. 6, 2016, p. 1-p. 7.

\* cited by examiner

SYSTEM FOR PRINTING ON THREE-DIMENSIONAL OBJECT AND NON-TRANSITORY COMPUTER READABLE MEDIUM STORED WITH PROGRAM FOR PRINTING ON THREE-DIMENSIONAL OBJECT

CROSS-REFERENCE TO RELATED APPLICATION

This application is a 371 application of the International PCT application serial no. PCT/JP2013/080863, filed on Nov. 15, 2013, which claims the priority benefit of Japan application no. 2012-252779, filed on Nov. 17, 2012. The entirety of each of the above-mentioned patent applications is hereby incorporated by reference herein and made a part of this specification.

TECHNICAL FIELD

The present invention relates to a system for printing on a three-dimensional object which prints an image on a three-dimensional object.

BACKGROUND ART

Conventionally, an inkjet printer that prints an image on a button used for clothing has been known as a system for printing on a three-dimensional object which prints an image on a three-dimensional object (see Patent Document 1).

PRIOR ART DOCUMENT

Patent Document

Patent Document 1: JP 4041470 B

SUMMARY OF THE INVENTION

Problem to be Solved by the Invention

In a case of printing images on a three-dimensional object relatively from a plurality of directions with respect to the three-dimensional object by an inkjet printer, an angle of arrangement of the three-dimensional object relative to the inkjet printer and an image that is to be printed need to be changed by a user each time printing of an image from one direction is completed, and there is a problem regarding the trouble to be taken therefor.

Further, in a case of generating one series of images on a three-dimensional object by printing each of a plurality of images that are obtained by dividing one image by an inkjet printer on the three-dimensional object relatively from different directions relative to the three-dimensional object, there also is a problem that it is difficult for the user to suitably divide the one image.

Thus, the present invention aims to provide a system for printing on a three-dimensional object that can facilitate printing of images from a plurality of directions onto the three-dimensional object compared to the conventional technique.

Solutions to the Problem

A system for printing on a three-dimensional object of the present invention includes: a recording head including a nozzle surface on which a nozzle for discharging ink is formed; a three-dimensional object supporting device that supports a three-dimensional object rotatably with a predetermined axis as a center; and a print control section that causes the recording head to print an image on the three-dimensional object while rotating the three-dimensional object by the three-dimensional object supporting device, wherein the print control section causes the three-dimensional object supporting device to support the three-dimensional object at a designated angle, for each of designated angles that are angles being designated, and causes the recording head to print divided images on the three-dimensional object, the divided images being images that are divided from a print image being an image to be printed on the three-dimensional object, the divided images being set with respect to the designated angles, and the system further includes:

an image accepting section that accepts the print image; and an image dividing section that divides the print image received by the image accepting section in association with the designated angles to set the divided images to the designated angles.

According to this configuration, the system for printing on a three-dimensional object of the present invention performs printing by automatically changing the support angle of the three-dimensional object with respect to the nozzle surface, and the image to be printed on the three-dimensional object in the case where the three-dimensional object is supported by the aforesaid angle with respect to the nozzle surface, so that the printing of images from the plurality of directions on the three-dimensional object can be facilitated compared to in the conventional technique. Further, the system for printing on a three-dimensional object of the present invention automatically divides the image to be printed on the three-dimensional object with respect to the plurality of designated angles, so that the printing of images from the plurality of directions on the three-dimensional object can be facilitated compared to in the conventional technique.

Further, in the system for printing on a three-dimensional object of the present invention, the image dividing section may set the divided images in a state where boundary portions of adjacent divided images are overlapped.

According to this configuration, the system for printing on a three-dimensional object of the present invention prints the respective divided images on the three-dimensional object while the boundary portions of the adjacent divided images are overlapped, so that the adjacent divided images are prevented from being printed on the three-dimensional object by being apart by various errors upon printing, as a result of which a generation of awkward splits between the adjacent divided images can be prevented. Thus, the system for printing on a three-dimensional object of the present invention can improve quality of the printing on the three-dimensional object compared to a configuration in which the respective divided images are printed on the three-dimensional object without the boundary portions of the adjacent divided images being overlapped.

Further, in the system for printing on a three-dimensional object of the present invention, the image dividing section may set the divided images in a state where a concentration becomes lower towards an end of each of the divided images at the boundary portions.

According to this configuration, the system for printing on a three-dimensional object of the present invention prints the respective divided image on the three-dimensional object in the state where the concentration becomes lower toward the end of each divided image at the boundary portions of the adjacent divided images, so that a generation of an awkward altering line of images caused by the concentration being extremely denser at the overlapped portions than at other portions within the boundary portions of the adjacent divided images can be prevented. Accordingly, the system for printing on a three-dimensional object of the present invention can improve the quality of the printing on the three-dimensional object compared to a configuration in which the respective divided images are printed on the three-dimensional object without the concentration being changed at the boundary portions of the adjacent divided images.

Further, in the system for printing on a three-dimensional object of the present invention, in a case of printing the print image on the three-dimensional object, the print control section may change, for each of the designated angles, orthogonal-direction positions being relative positions of the recording head and the three-dimensional object supporting device in a direction orthogonally intersecting the nozzle surface, to orthogonal-direction setting positions being the orthogonal-direction positions that are set for the designated angle, and the system for printing on a three-dimensional object may include an orthogonal-direction position setting section that sets the orthogonal-direction setting positions for the designated angle based on a size of the three-dimensional object inputted from outside, and the designated angle.

According to this configuration, in the system for printing on a three-dimensional object of the present invention, the relative positions of the recording head and the three-dimensional object supporting device in the direction orthogonally intersecting the nozzle surface are automatically changed to suitable positions according to the size of the three-dimensional object, and the designated angle, so that it can facilitate printing of the images from the plurality of directions on the three-dimensional object compared to a configuration in which the user must input the relative positions of the recording head and the three-dimensional object supporting device in the direction orthogonally intersecting the nozzle surface for each of the designated angles.

Further, in the system for printing on a three-dimensional object of the present invention, in a case of printing the print image on the three-dimensional object, the print control section may change, for each of the designated angles, parallel-direction positions being relative positions of the recording head and the three-dimensional object supporting device in a direction parallel to the nozzle surface, to parallel-direction setting positions being the parallel-direction positions that are set for the designated angle, and the system for printing on a three-dimensional object may include a parallel-direction position setting section that sets the parallel-direction setting positions for the designated angle based on a size of the three-dimensional object inputted from outside, and the designated angle.

According to this configuration, in the system for printing on a three-dimensional object of the present invention, the relative positions of the recording head and the three-dimensional object supporting device in the direction parallel to the nozzle surface are automatically changed to suitable positions according to the size of the three-dimensional object, and the designated angle, so that it can facilitate printing of the images from the plurality of directions on the three-dimensional object compared to a configuration in which the user must input the relative positions of the recording head and the three-dimensional object supporting device in the direction parallel to the nozzle surface for each of the designated angles.

A non-transitory computer readable medium stored with a program of the present invention for printing on a three-dimensional object is to be executed by a computer that controls an inkjet printer that is provided with: a recording head including a nozzle surface on which a nozzle for discharging ink is formed; a three-dimensional object supporting device that supports the three-dimensional object rotatably with a predetermined axis as a center; and a print control section that causes the recording head to print an image on the three-dimensional object while rotating the three-dimensional object by the three-dimensional object supporting device, wherein the print control section causes the three-dimensional object supporting device to support the three-dimensional object at a designated angle, for each of designated angles that are angles being designated, and causes the recording head to print divided images on the three-dimensional object, the divided images being images that are divided from a print image being an image to be printed on the three-dimensional object, the divided images being set with respect to the designated angles, and the program causes the computer to function as: an image accepting section that accepts the print image; and an image dividing section that divides the print image received by the image accepting section in association with the designated angles to set the divided images to the designated angles.

According to this configuration, the computer that executes the program for printing on a three-dimensional object of the present invention automatically divides the image to be printed on the three-dimensional object for the plurality of designated angles, so it can facilitate printing of the images from the plurality of directions on the three-dimensional object compared to in the conventional technique.

Effects of the Invention

The system for printing on a three-dimensional object of the present invention can facilitate printing of the images from the plurality of directions on the three-dimensional object compared to the conventional technique.

EMBODIMENTS OF THE INVENTION

Hereinbelow, an embodiment of the present invention will be described with reference to the drawings.

Firstly, a configuration of a three-dimensional object printing system according to the present embodiment will be described.

Figure 1:
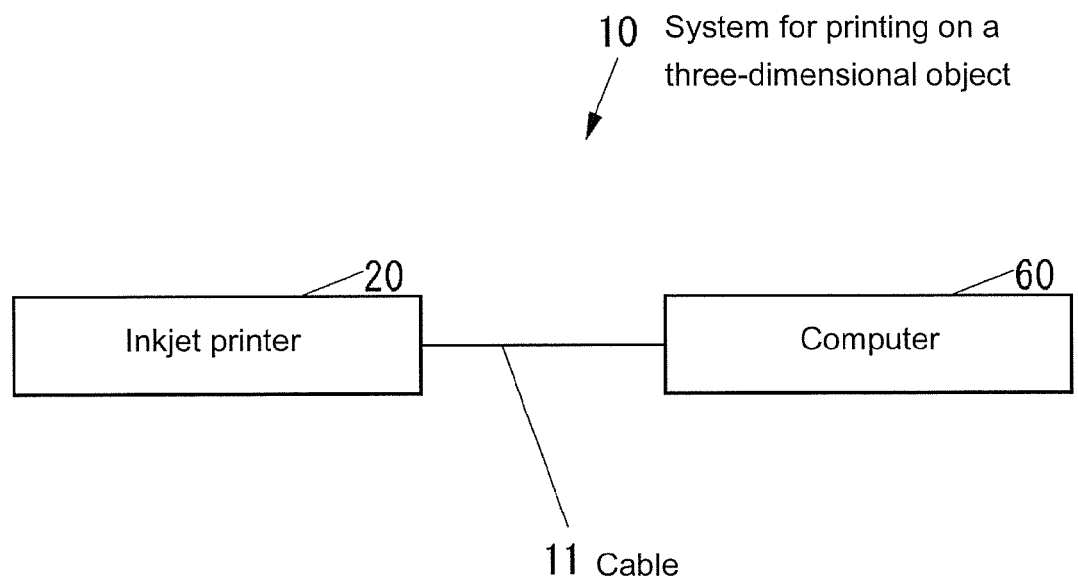
FIG. 1 is a block diagram of a system for printing on a three-dimensional object according to one embodiment of the present invention.

FIG. 1 is a block diagram of a system 10 for printing on a three-dimensional object according to the present embodiment.

As shown in FIG. 1, the system 10 for printing on a three-dimensional object is provided with an inkjet printer 20 that prints an image on a three-dimensional object 90 (see FIG. 2) such as a cover for a portable phone such as a smartphone, and a computer 60 that inputs print data to the inkjet printer 20. The inkjet printer 20 and the computer 60 are connected communicably to each other via a cable 11 such as a USB (Universal Serial Bus) cable. It should be noted that, the inkjet printer 20 and the computer 60 may be connected communicably to each other via a network such as a LAN (Local Area Network), Internet, or the like, instead of the cable 11.

Figure 2:
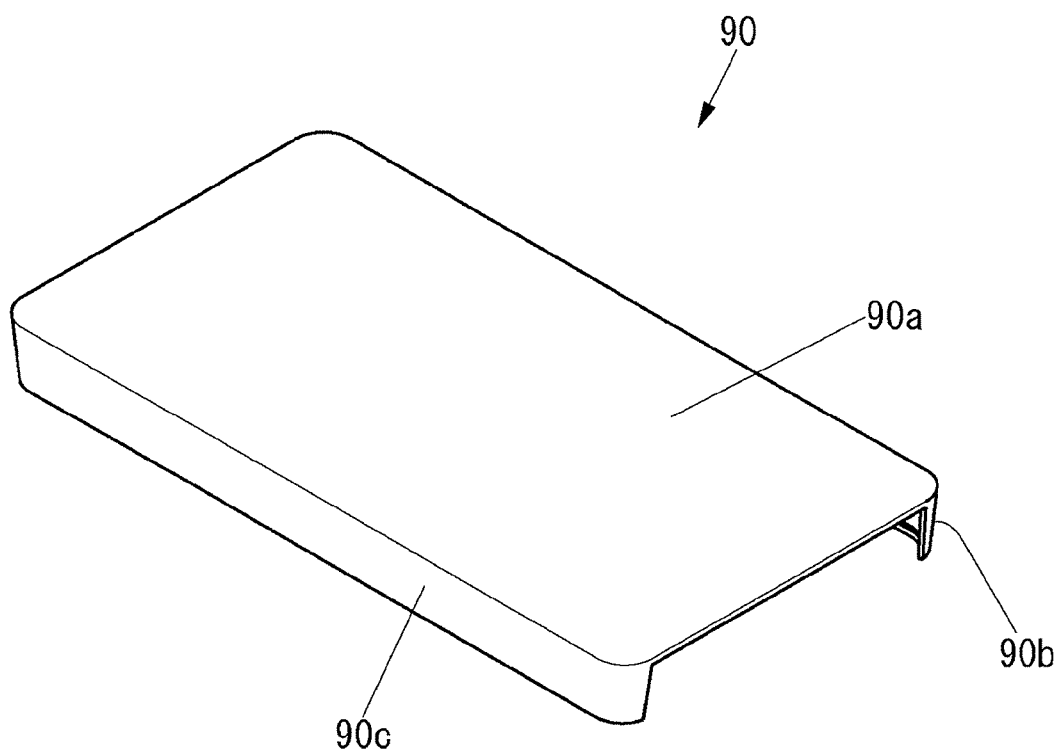
FIG. 2 is an outer perspective view of the three-dimensional object on which images are printed by an inkjet printer shown in FIG. 1.

FIG. 2 is an outer perspective view of the three-dimensional object 90 on which an image is printed by the inkjet printer 20.

As shown in FIG. 2, the three-dimensional object 90 includes a main surface part 90a where a main surface, being a primary surface, is formed, a first side surface part 90b where a first side surface being a surface that is substantially orthogonal to the main surface and continued from the main surface is formed, and a second side surface part 90c where a second side surface being a surface that is substantially orthogonal to the main surface and continued from the main surface on an opposite side from the first side surface is formed.

Figure 3:
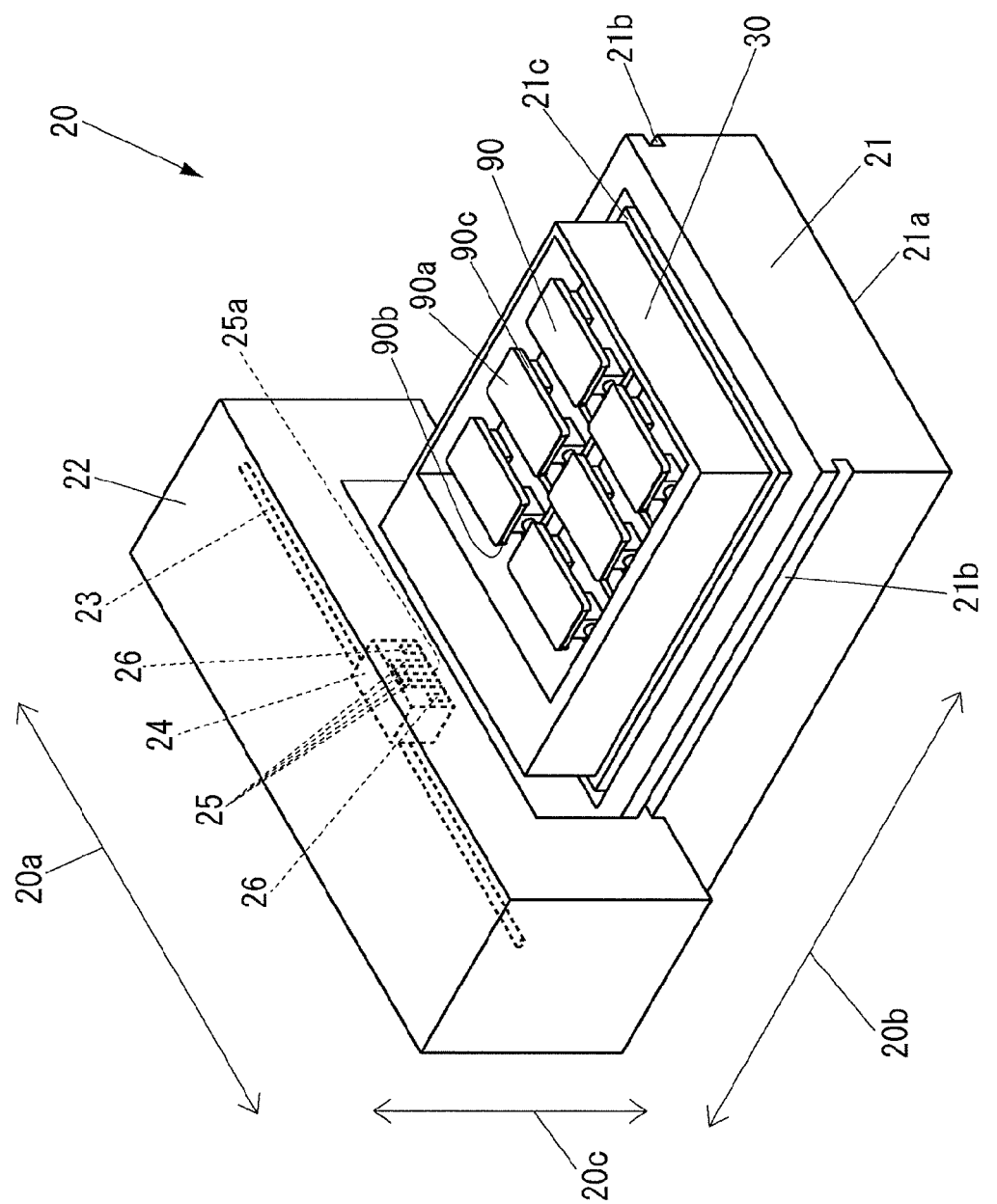
FIG. 3 is an outer perspective view of the inkjet printer shown in FIG. 1.

FIG. 3 is an outer perspective view of the inkjet printer 20.

As shown in FIG. 3, the inkjet printer 20 includes a table 21 having an installing section 21a that is installed on a location of installation such as a floor, a main body 22 extending in a main scanning direction shown by an arrow 20a, and a three-dimensional object supporting device 30 that rotatably supports the three-dimensional objects 90 attached to the table 21.

The table 21 includes guiding mechanisms 21b on both sides in the main scanning direction shown by the arrow 20a, where the guiding mechanisms 21b extending in a sub scanning direction shown by an arrow 20b that orthogonally intersects with the main scanning direction shown by the arrow 20a, and supporting the main body 22 to be movable in the sub scanning direction shown by the arrow 20b. Further, the table 21 includes a supporting device mounting stage 21c that mounts thereon the three-dimensional object supporting device 30. The supporting device mounting stage 21c is movable with respect to the installing section 21a, in a direction shown by an arrow 20c, which orthogonally intersects with both the main scanning direction shown by the arrow 20a and the sub scanning direction shown by the arrow 20b.

The main body 22 includes therein a guide rail 23 extending in the main scanning direction shown by the arrow 20a, and a carriage 24 supported on the guide rail 23 so as to be movable in the main scanning direction shown by the arrow 20a. The carriage 24 is mounted with a plurality of recording heads 25 for discharging ultraviolet curable ink in a direction shown by an arrow 20c toward the table 21, and an ultraviolet irradiation device 26 such as an LED (Light Emitting Diode) for delivering ultraviolet ray for curing the ultraviolet curable ink discharged by the recording heads 25 toward the table 21. The recording heads 25 include nozzle surfaces 25a where nozzles for discharging ink that are not shown are formed.

Figure 4:
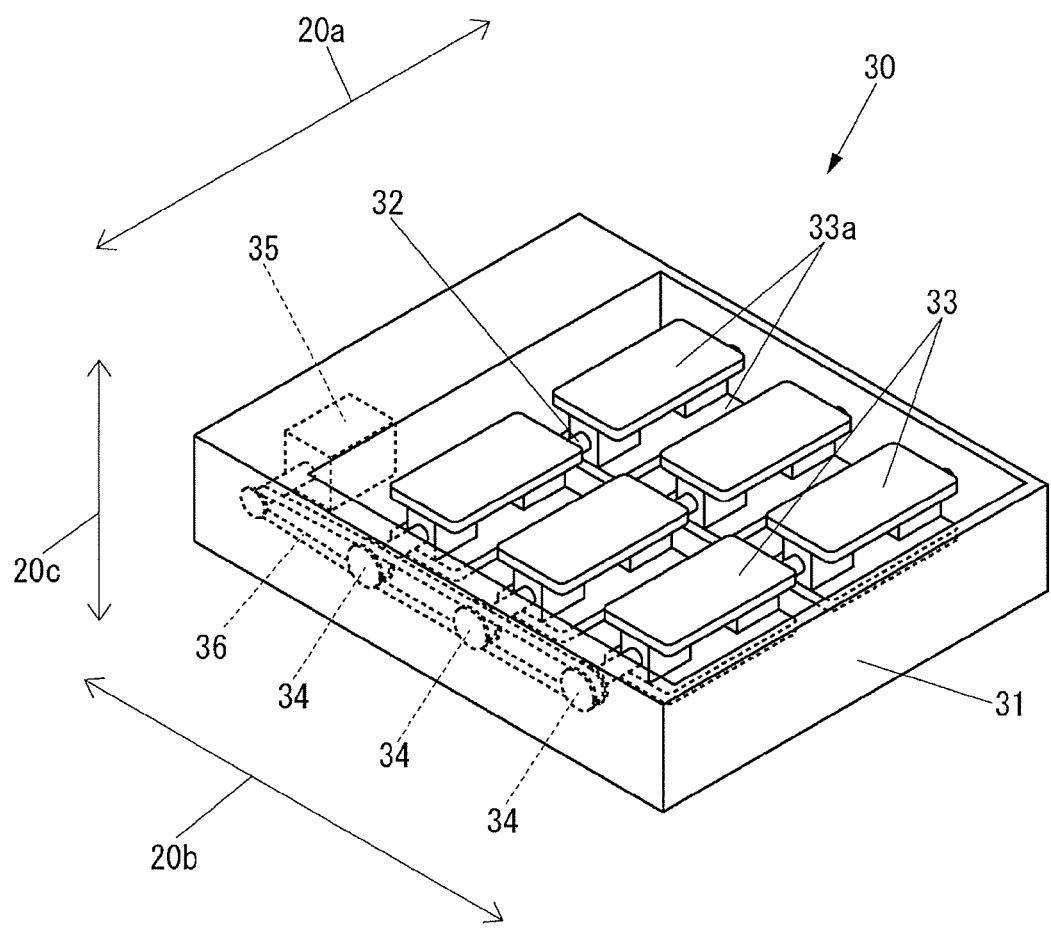
FIG. 4 is an outer perspective view of a three-dimensional object supporting device shown in FIG. 3.

FIG. 4 is an outer perspective view of the three-dimensional object supporting device 30.

As shown in FIG. 4, the three-dimensional object supporting device 30 includes a housing 31 attached to the supporting device mounting stage 21c (see FIG. 3) of the table 21 (see FIG. 3), three shaft members 32 that are supported in the housing 31 rotatably, three-dimensional object supporting sections 33, two of which are fixed to each shaft member 32, and that support the three-dimensional objects 90 (see FIG. 3), pulleys 34 fixed to one ends of the shaft members 32, a stepping motor 35 for generating driving force for the shaft members 32 to rotate, and a timing belt 36 for simultaneously transmitting the driving force of the stepping motor 35 to the three pulleys 34.

The three shaft members 32 are arranged to align parallel to each other so that their positions in the direction shown by the arrow 20c are same as one another, and extending in the main scanning direction shown by the arrow 20a.

Each three-dimensional object supporting section 33 has two three-dimensional object attaching sections 33a to which the three-dimensional objects 90 are attached arranged in line symmetry with a center axis of the shaft member 32 as a center. Accordingly, the three-dimensional object supporting device 30 can support a total of two three-dimensional objects 90 by one three-dimensional object supporting section 33, that is, by two three-dimensional object attaching sections 33a; a total of four three-dimensional objects 90 by one shaft member 32, that is, by two three-dimensional object supporting sections 33; and as a whole, that is, a total of twelve three-dimensional objects 90 can be supported by three shaft members 32.

Hereinbelow, an angle of rotation of the shaft member 32, in a case where the main surface of the three-dimensional object 90 attached to predetermined one of the two three-dimensional object attaching sections 33a of the three-dimensional object supporting section 33 is substantially parallel to the nozzle surfaces 25a of the recording heads 25, and the main surface is facing an opposite side from the table 21 side, will be defined as 0 degrees. Further, the angle of rotation of the shaft member 32, in a case where the second side surface of the three-dimensional object 90 attached to the predetermined one of the two three-dimensional object attaching sections 33a of the three-dimensional object supporting section 33 is substantially parallel to the nozzle surfaces 25a of the recording heads 25, and the second sides surface is facing the opposite side from the table 21 side, while the first side surface of the three-dimensional object 90 attached to the other of the two three-dimensional object attaching sections 33a of the three-dimensional object supporting section 33 is substantially parallel to the nozzle surfaces 25a of the recording heads 25, and the first side surface is facing the opposite side from the table 21 side, will be defined as 90 degrees. In defining as above, the angle of rotation of the shaft member 32 is 180 degrees in a case where the main surface of the three-dimensional object 90 attached to the other of the two three-dimensional object attaching sections 33a of the three-dimensional object supporting section 33 is substantially parallel to the nozzle surfaces 25a of the recording heads 25, and the main surface is facing the opposite side from the table 21 side. Further, the angle of rotation of the shaft member 32 is 270 degrees in a case where the first side surface of the three-dimensional object 90 attached to the predetermined one of the two three-dimensional object attaching sections 33a of the three-dimensional object supporting section 33 is substantially parallel to the nozzle surfaces 25a of the recording heads 25, and the first side surface is facing the opposite side from the table 21 side, while the second side surface of the three-dimensional object 90 attached to the other of the two three-dimensional object attaching sections 33a of the three-dimensional object supporting section 33 is substantially parallel to the nozzle surfaces 25a of the recording heads 25, and the second side surface is facing the opposite side from the table 21 side.

Figure 5:
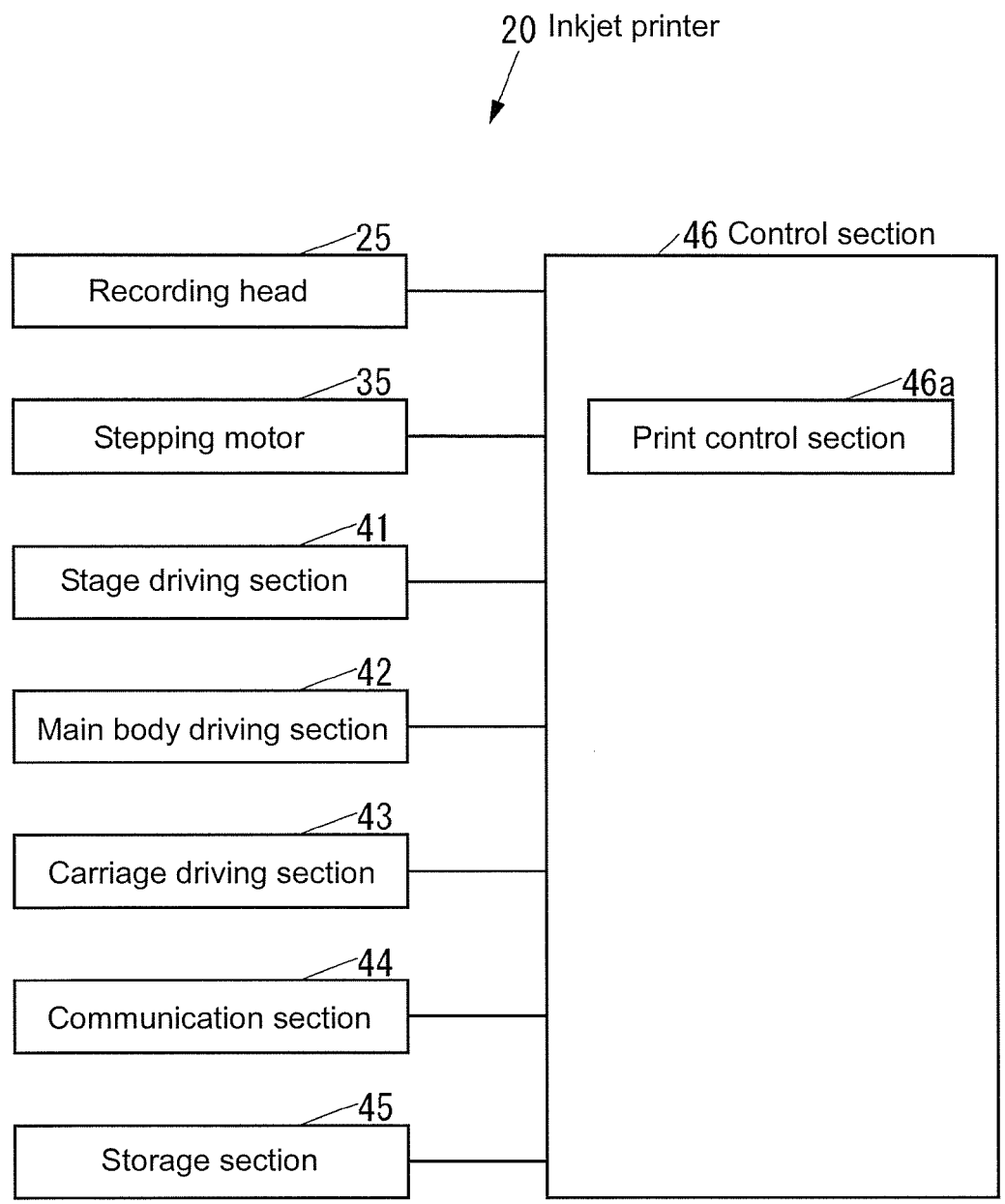
FIG. 5 is a block diagram of the inkjet printer shown in FIG. 3.

FIG. 5 is a block diagram of the inkjet printer 20.

As shown in FIG. 5, the inkjet printer 20 includes the aforementioned recording heads 25 and stepping motor 35, a stage driving section 41 that moves the supporting device mounting stage 21c (see FIG. 3) relative to the installing section 21a (see FIG. 3), a main body driving section 42 that moves the main body 22 (see FIG. 3) in the sub scanning direction shown by the arrow 20b (see FIG. 3) relative to the table 21 (see FIG. 3), a carriage driving section 43 that moves the carriage 24 (see FIG. 3) in the main scanning direction shown by the arrow 20a (see FIG. 3) relative to the guide rail 23 (see FIG. 3), a communication section 44 that is a communication device for performing communication with external devices such as the computer 60 (see FIG. 1) via the cable 11 (see FIG. 1) or a network, a storage section 45 that is a storage device such as an EEPROM (Electrically Erasable Programmable Read Only Memory) storing various types of data, and a control section 46 that controls an entirety of the inkjet printer 20.

The control section 46 includes, for example, a CPU (Central Processing Unit), a ROM (Read Only Memory) that preliminarily stores program and various types of data, and a RAM (Random Access Memory) used as work area for the CPU. The CPU is configured to execute the program stored in the ROM or the storage section 45.

By executing the program stored in the storage section 45, the control section 46 functions as a print control section 46a that causes an image to be printed on the three-dimensional objects 90 by the recording heads 25 while rotating the three-dimensional objects 90 (see FIG. 3) by the three-dimensional object supporting sections 33 (see FIG. 4). The print control section 46a has a function to cause a divided image, being an image divided from the print image being the image to be printed on the three-dimensional object 90, that is set to a designated angle, to be printed on the three-dimensional object 90 by the recording heads 25 while causing the three-dimensional object 90 to be supported by the three-dimensional object supporting section 33 at the designated angle, for each of the designated angles being angles that are designated.

Figure 6:
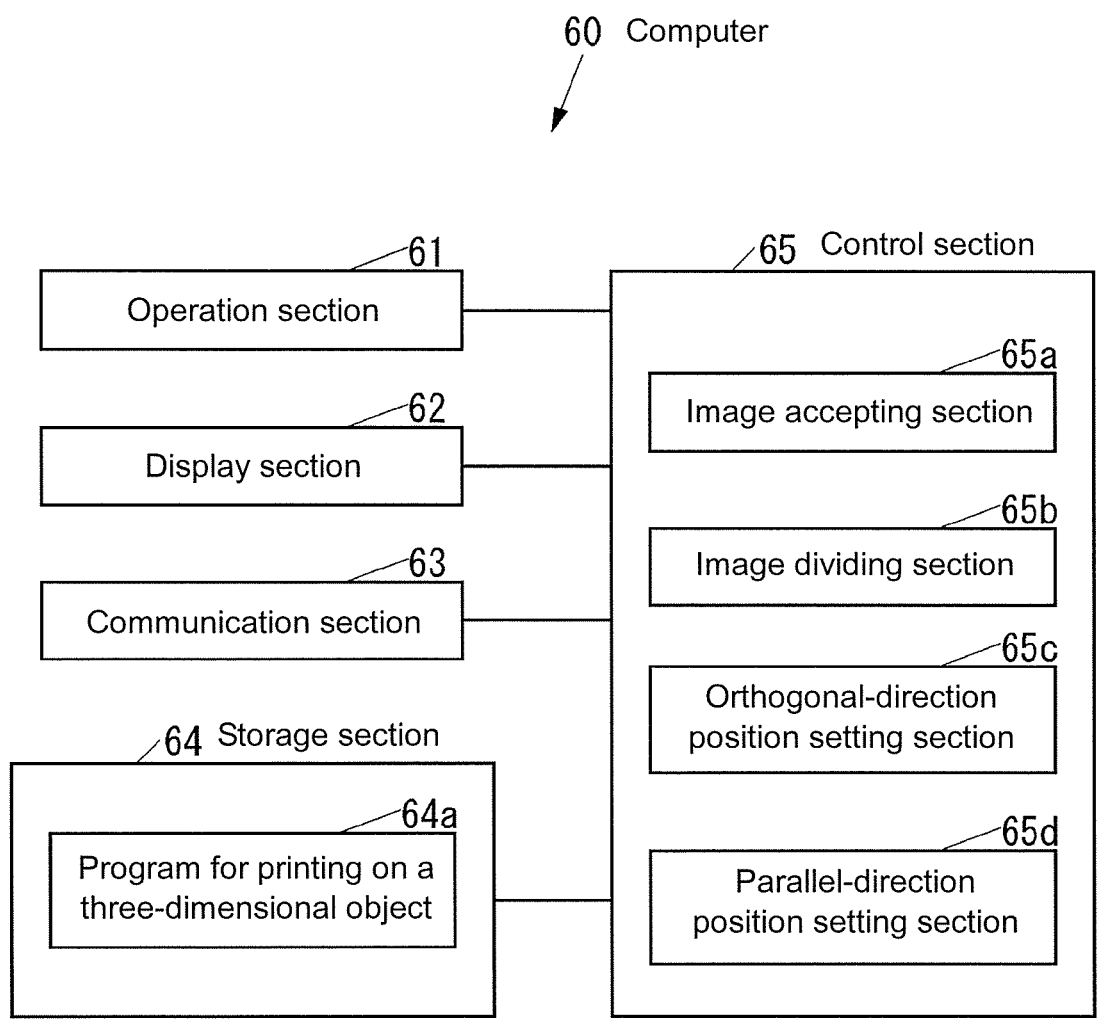
FIG. 6 is a block diagram of a computer shown in FIG. 1.

FIG. 6 is a block diagram of the computer 60.

As shown in FIG. 6, the computer 60 includes an operation section 61 being an input device such as a mouse or a keyboard through which various operations are inputted, a display section 62 being a display device such as an LCD for displaying various types of information, a communication section 63 being a communication device that performs communication with external devices such as the inkjet printer 20 (see FIG. 1) through the cable 11 (see FIG. 1) or a network, a storage section 64 being a storage device such as an HDD (Hard Disk Drive) storing program and various types of data, and a control section 65 that controls an entirety of the computer 60. The computer 60 is configured for example of a computer such as a PC (Personal Computer).

The storage section 64 stores a program 64a for printing on a three-dimensional object being a program for causing the inkjet printer 20 to print an image on the three-dimensional object 90 (see FIG. 3). The program 64a for printing on a three-dimensional object may be installed in the computer 60 in during the manufacturing process of the computer 60, or may be installed additionally to the computer 60 from a storage medium such as a CD (Compact Disk), a DVD (Digital Versatile Disk), and the like, or may be installed additionally to the computer 60 from a network.

The control section 65 for example includes a CPU, a ROM that preliminarily stores a program and various types of data, and a RAM used as a work area for the CPU. The CPU is configured to execute the program stored in the ROM or the storage section 64.

By executing the program 64a for printing on a three-dimensional object stored in the storage section 64, the control section 65 functions as an image accepting section 65a that receives a print image, an image dividing section 65b that divides the print image received by the image accepting section 65a in association with the designated angles to set the divided images to the designated angles, an orthogonal-direction position setting section 65c that sets orthogonal-direction setting positions, to be set for the designated angles, for the designated angles, which are orthogonal-direction positions being relative positions of the recording heads 25 (see FIG. 3) and the three-dimensional object supporting devices 30 (see FIG. 3) in the direction orthogonally intersecting the nozzle surfaces 25a (see FIG. 3), that is, in the direction shown by the arrow 20c (see FIG. 3), and a parallel-direction position setting section 65d that sets parallel-direction setting positions, to be set for the designated angles, for the designated angles, which are parallel-direction positions being relative positions of the recording heads 25 and the three-dimensional object supporting devices 30 in the direction parallel to the nozzle surfaces 25a, that is, the sub scanning direction shown by the arrow 20b (see FIG. 3).

Next, the operation of the system 10 for printing on a three-dimensional object will be described.

Firstly, a summary of the flow up to when the print data is sent to the inkjet printer 20 from the computer 60 will be described.

Figure 7:
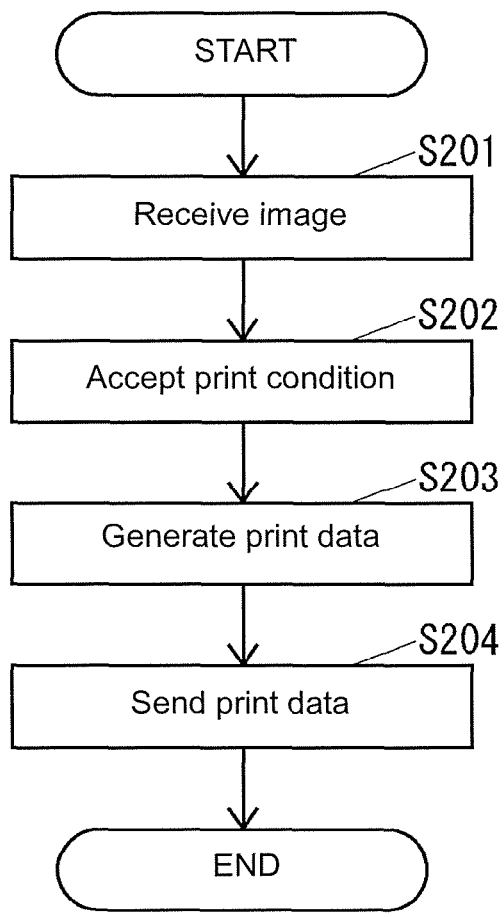
FIG. 7 is a flowchart of an operation of the computer shown in FIG. 6.

FIG. 7 is a flowchart of an operation of the computer 60.

The control section 65 of the computer 60 executes the operation shown in FIG. 7 by activating the program 64a for printing on a three-dimensional object in accordance with an instruction via the operation section 61.

As shown in FIG. 7, the image accepting section 65a of the control section 65 receives an image in accordance with an instruction via the operation section 61 (S201). For example, the image accepting section 65a can receive an image stored in the storage section 64, or an image received from an external device through the communication section 63 in accordance with an instruction via the operation section 61.

Next, the control section 65 receives various print conditions such as the rotation angle of the shaft members 32 upon printing the image, the range to be printed within the image received in S201, and the like in accordance with an instruction via the operation section 61 (S202).

Next, the control section 65 generates print data based on the image received in S201 and the print conditions received in S202 in accordance with an instruction via the operation section 61 (S203).

Finally, the control section 65 sends the print data generated in S203 to the inkjet printer 20 via the communication section 63 (S204), and ends the process shown in FIG. 7.

It should be noted that, the control section 65 may be configured to store the print conditions received in S202 in the storage section 64 so that it can be used again in printing that will take place next or subsequent thereafter.

Next, the receipt of the print conditions in S202 will be described in detail.

Figure 8:
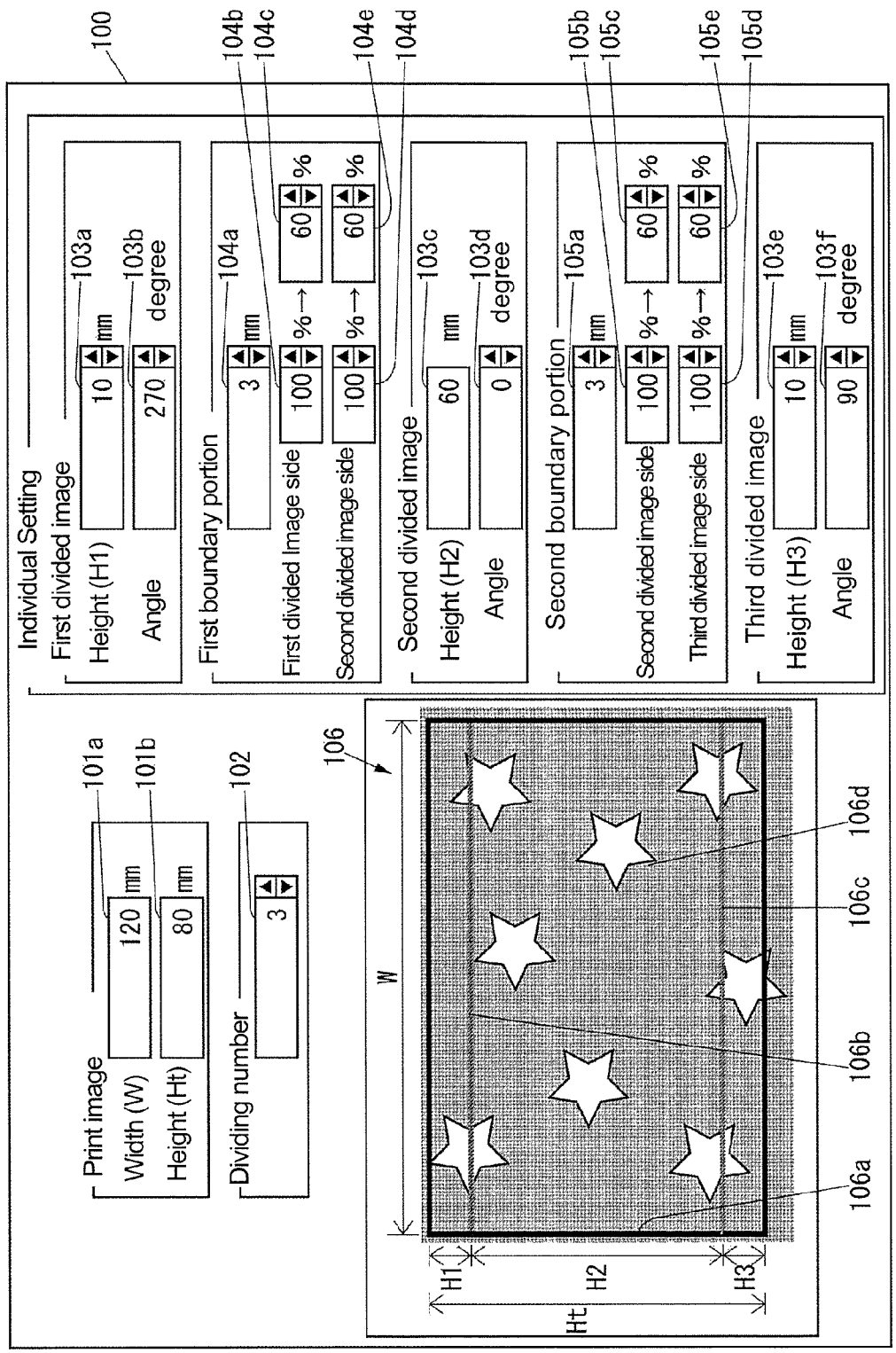
FIG. 8 is a diagram showing an example of a print condition receiving screen displayed on a display section shown in FIG. 6.

The control section 65 of the computer 60 displays a print condition receiving screen 100 shown in FIG. 8 on the display section 62 in accordance with an instruction via the operation section 61.

FIG. 8 is a diagram showing an example of the print condition receiving screen 100 displayed on the display section 62.

As shown in FIG. 8, the print condition receiving screen 100 includes a print image width text box 101a for displaying a length in the main scanning direction shown by the arrow 20a (which is hereafter referred to as "print image width") among the print image size, and a print image height text box 101b for displaying a length in the sub scanning direction shown by the arrow 20b (which is hereafter referred to as "print image height") among the print image size. It should be noted that, a value displayed in the print image width text box 101a is the length in the main scanning direction shown by the arrow 20a of the main surface, the first side surface, and the second side surface of the three-dimensional object 90, which is determined by the length thereof being preliminarily set in the computer 60. Further, a value displayed in the print image height text box 101b is a sum of a length in the sub scanning direction shown by the arrow 20b of the main surface of the three-dimensional object 90 attached to the three-dimensional object attaching section 33a in the case where the rotation angle of the shaft member 32 is 0 degrees or 180 degrees, a length in the sub scanning direction shown by the arrow 20b of the first side surface of the three-dimensional object 90 attached to the three-dimensional object attaching section 33a in the case where the rotation angle of the shaft member 32 is 90 degrees or 270 degrees, and a length in the sub scanning direction shown by the arrow 20b of the second side surface of the three-dimensional object 90 attached to the three-dimensional object attaching section 33a in the case where the rotation angle of the shaft member 32 is 90 degrees or 270 degrees, and is determined by the lengths thereof that are preliminarily set to the computer 60. It should be noted that, the computer 60 may be configured to preliminarily set the various lengths of the three-dimensional object 90 by reading information associated to the types of the designated three-dimensional object 90 from among information in a template data, in a case where the template data including information on the various lengths of the three-dimensional objects 90 in association with types of the three-dimensional objects 90 is stored in the storage section 64 and a type of the three-dimensional object 90 is designated via the operation section 61.

Further, the print condition receiving screen 100 includes a dividing number spin box 102 for designating a number to divide the print image. In regards to the items of individual settings shown in FIG. 8, the number of the setting items is changed in accordance with a designated dividing number in the dividing number spin box 102. A default value of the dividing number spin box 102 is preliminarily set in accordance with types of the three-dimensional object 90, and is for example "3". For example, the default value may be included in the aforementioned template data. Hereinbelow a case where the dividing number designated in the dividing number spin box 102 is "3" will be described.

Further, the print condition receiving screen 100 includes a first divided image height spin box 103a for designating an original length in the sub scanning direction shown by the arrow 20b of a first divided image being a first image included in the print image divided by the dividing number "3" (hereinbelow referred to as a "first divided image original height"), a first divided image angle spin box 103b for designating the designated angle of the rotation of the shaft member 32 in the case where the first divided image is to be printed, a second divided image height text box 103c for displaying the original length in the sub scanning direction shown by the arrow 20b of the second divided image, being a second image included in the print image divided by the dividing number "3" (hereinbelow referred to as a "second divided image original height"), and adjacent to the first divided image, a second divided image angle spin box 103d for designating the designated angle of the rotation of the shaft member 32 in the case where the second divided image is to be printed, a third divided image height spin box 103e for designating the original length in the sub scanning direction shown by the arrow 20b of the third divided image, being a third image included in the print image divided by the dividing number "3" (hereinbelow referred to as a "third divided image original height"), and adjacent to the second divided image, and a third divided image angle spin box 103f for designating the designated angle of the rotation of the shaft member 32 in the case where the third divided image is to be printed. Default values of the first divided image height spin box 103a, the first divided image angle spin box 103b, the second divided image height text box 103c, the second divided image angle spin box 103d, the third divided image height spin box 103e, and the third divided image angle spin box 103f are set preliminarily in accordance with types of the three-dimensional objects 90, which are for example "10", "270", "60", "0", "10", and "90". For example, these default values may be included in the aforementioned template data.

It should be noted that, in the print condition receiving screen 100 shown in FIG. 8, all of the first divided image original height, the second divided image original height, and the third divided image original height are configured changeable by making the values of the first divided image original height and the third divided image original height directly changeable among the first divided image original height, the second divided image original height, and the third divided image original height under the premise that the sum of the first divided image original height, the second divided image original height, and the third divided image original height is equal to the value displayed on the print image height text box 101b, however, the first divided image original height, the second divided image original height, and the third divided image original height may be configured changeable by methods other than the above. For example, if there is the premise that the first divided image original height and the third divided image original height are equal in the three-dimensional object 90, the value of only one of the first divided image original height and the third divided image original height may be configured directly changeable among the first divided image original height, the second divided image original height, and the third divided image original height.

The print condition receiving screen 100 includes a first boundary portion height spin box 104a for designating a length (hereinbelow referred to as a "first boundary portion height") in the sub scanning direction shown by the arrow 20b of an overlap in a boundary portion of the first divided image and the second divided image (hereinbelow referred to as a "first boundary portion"), a concentration spin box 104b for designating a concentration of an end of the first boundary portion of the first divided image that overlaps with an end of the second divided image, a concentration spin box 104c for designating a concentration of an end of the first divided image within the first boundary portion of the first divided image, a concentration spin box 104d for designating a concentration of an end of the first boundary portion of the second divided image that overlaps with the first divided image, and a concentration spin box 104e for designating a concentration of an end of the second divided image in the first boundary portion of the second divided image. The concentration spin boxes 104c, 104e can designate only the values that are equal to or less than the concentration spin boxes 104b, 104d, respectively. Default values of the first boundary portion height spin box 104a, and the concentration spin boxes 104b, 104c, 104d, 104e are set preliminarily in accordance with types of the three-dimensional objects 90. For example, the default values thereof may be included in the aforementioned template data.

The print condition receiving screen 100 includes a second boundary portion height spin box 105a for designating a length (hereinbelow referred to as a "second boundary portion height") in the sub scanning direction shown by the arrow 20b of an overlap in a boundary portion of the second divided image and the third divided image (hereinbelow referred to as a "second boundary portion"), a concentration spin box 105b for designating a concentration of an end of the second boundary portion of the second divided image that overlaps with an end of the third divided image, a concentration spin box 105c for designating a concentration of an end of the second divided image within the second boundary portion of the second divided image, a concentration spin box 105d for designating a concentration of an end of the second boundary portion of the third divided image that overlaps with the end of the second divided image, and a concentration spin box 105e for designating a concentration of an end of the third divided image in the second boundary portion of the third divided image. The concentration spin boxes 105c, 105e can designate only the values that are equal to or less than the concentration spin boxes 105b, 105d, respectively. Default values of the second boundary portion height spin box 105a, and the concentration spin boxes 105b, 105c, 105d, 105e are set preliminarily in accordance with types of the three-dimensional objects 90. For example, these default values may be included in the aforementioned template data.

Further, the print condition receiving screen 100 includes a preview region 106 that pseudo-displays print contents. The preview region 106 includes a print image frame 106a indicating the size of the print image displayed in the print image width text box 101a and the print image height text box 101b, a first boundary center line 106b indicating a center line of the first boundary portion designated in the first divided image height spin box 103a, a second boundary center line 106c indicating a center line of the second boundary portion designated in the third divided image height spin box 103e, and an image 106d that was inputted by a user in S201 of FIG. 7. The user can change position and size of the image 106d in the preview region 106 via the operation section 61 so as to change the part of the image 106d to be fitted in the print image frame 106a.

The part of the image 106d to be fitted in the print image frame 106a is a part that is to be received by the image accepting section 65a as the print image in the case where the print data is generated in S203 of FIG. 7. Here, the print image received by the image accepting section 65a is divided by the image dividing section 65b, in the case where the print data is generated in S203, in accordance with the various settings in the print condition receiving screen 100 for each of the designated angle designated in the first divided image angle spin box 103b, the designated angle designated in the second divided image angle spin box 103d, and the designated angle designated in the third divided image angle spin box 103f. Further, the images divided as above are set as the divided images for each of the designated angles by the image dividing section 65b. The divided image for a designated angle is the part within the image received in S201 to be printed by this designated angle.

Figure 9:
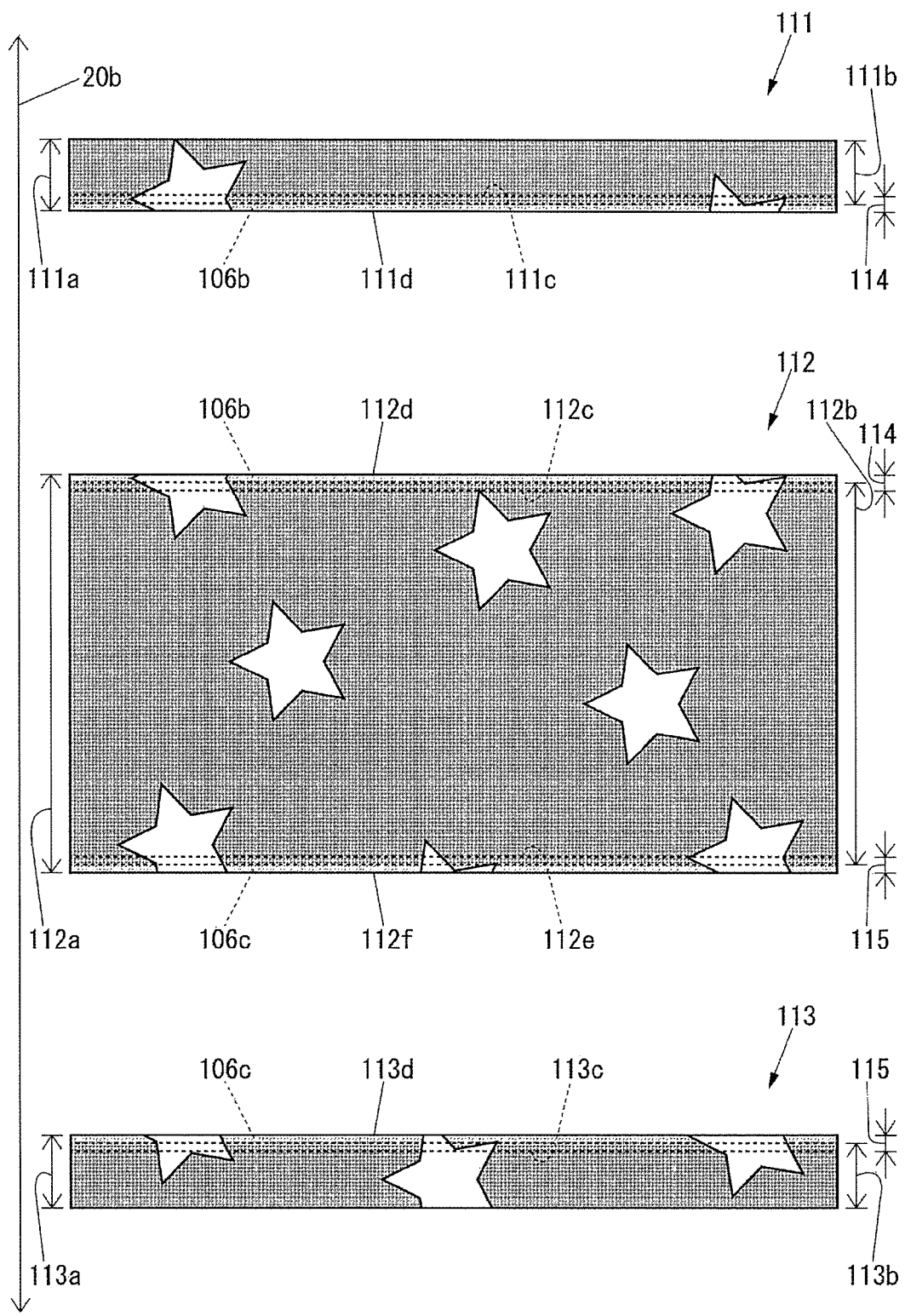
FIG. 9 is a diagram showing an example of a first divided image, a second divided image, and a third divided image that are generated under conditions designated in the print condition receiving screen shown in FIG. 8.

FIG. 9 is a diagram showing an example of a first divided image 111, a second divided image 112, and a third divided image 113 generated under conditions designated by the print condition receiving screen 100. It should be noted that, in FIG. 9, broken lines are depicted for the sake of explanation, and are not included in the actual images.

As shown in FIG. 9, the first divided image 111 has a length 111a in the sub scanning direction shown by the arrow 20b that is elongated by half the length of the first boundary portion height 114 designated by the first boundary portion height spin box 104a as compared to the first divided image original height 111b designated by the first divided image height spin box 103a. The first divided image 111 has its concentration lowered toward the end 111d in the first boundary portion, such that the concentration at an end 111c in the first boundary portion overlapping an end 112d of the second divided image 112 is the concentration designated in the concentration spin box 104b, and the concentration at an end 111d of the first divided image 111 in the first boundary portion is the concentration designated in the concentration spin box 104c.

The second divided image 112 has a length 112a in the sub scanning direction shown by the arrow 20b that is elongated by the total of half the length of the first boundary portion height 114 designated by the first boundary portion height spin box 104a and half the length of the second boundary portion height 115 designated by the second boundary portion height spin box 105a, as compared to the second divided image original height 112b displayed in the second divided image height text box 103c. The second divided image 112 has its concentration lowered toward the end 112d in the first boundary portion, such that the concentration of the end 112c overlapping the end 111d of the first divided image 111 in the first boundary portion is the concentration designated in the concentration spin box 104d, and the concentration at an end 112*d* of the second divided image 112 in the first boundary portion is the concentration designated in the concentration spin box 104*e*. The second divided image 112 has its concentration lowered toward the end 112*f* in the second boundary portion, such that the concentration of the end 112*e* overlapping the end 113*d* of the third divided image 113 in the second boundary portion is the concentration designated in the concentration spin box 105*b*, and the concentration at an end 112*f* of the second divided image 112 in the second boundary portion is the concentration designated in the concentration spin box 105*c*.

The third divided image 113 has a length 113*a* in the sub scanning direction shown by the arrow 20*b* that is elongated by half the length of the second boundary portion height 115 designated by the second boundary portion height spin box 105*a* as compared to the third divided image original height 113*b* designated by the third divided image height spin box 103*e*. The third divided image 113 has its concentration lowered toward the end 113*d* in the second boundary portion, such that the concentration at an end 113*c* in the second boundary portion overlapping the end 112*f* of the second divided image 112 is the concentration designated in the concentration spin box 105*d*, and the concentration at an end 113*d* of the third divided image 113 in the second boundary portion is the concentration designated in the concentration spin box 105*e*.

It should be noted that, in the case of lowering the concentration at the boundary portion, each of the divided images realizes the concentration reduction by reducing duty, which is a rate by which dots occupy a section area, that is, by generating spaces between dots. The image dividing section 65*b* can realize the concentration reduction in the boundary portions of the respective divided images by changing the threshold upon binarizing the image data for determining the presence or absence of the dots. Further, as another method, to prevent the occurrence of spaces between dots in the boundary portion of divided images in the image printed on the three-dimensional object 90, the image dividing section 65*b* can realize the concentration reduction in the boundary portions of the respective divided images so that the spaces between dots can be complemented by the adjacent divided images. In the case of realizing the concentration reduction in the boundary portions so as to complement the spaces between dots by the adjacent divided images, when the total of the concentration in the boundary portions in the respective divided images exceeds 100%, various methods, such as a method to increase dots for pixels with dark color such as black or cyan in the image, a method to increase dots for random pixels in the image, and the like can be employed as a method of arranging the dots at the portion exceeding 100%.

Figure 10A:
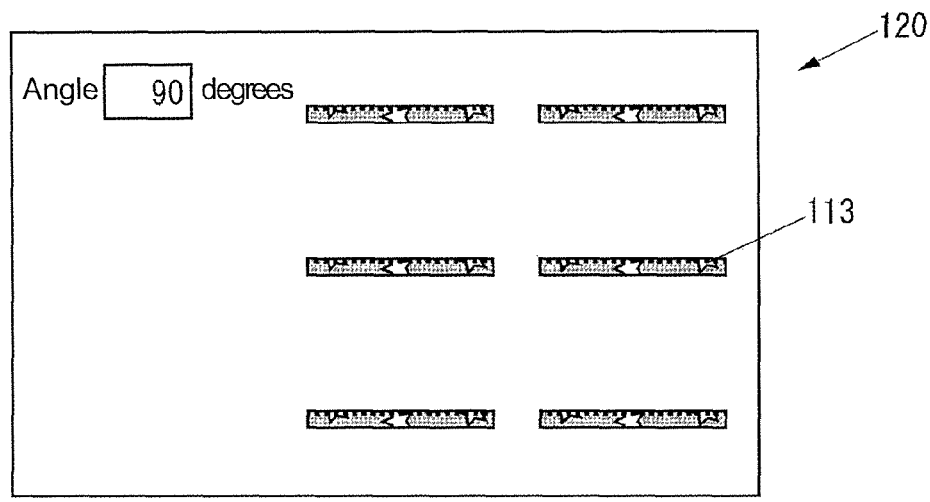
FIG. 10A is a diagram showing an example of an angle-specific print preview screen displayed on the display section shown in FIG. 6 in a case where a designated angle is 90 degrees.
Figure 10B:
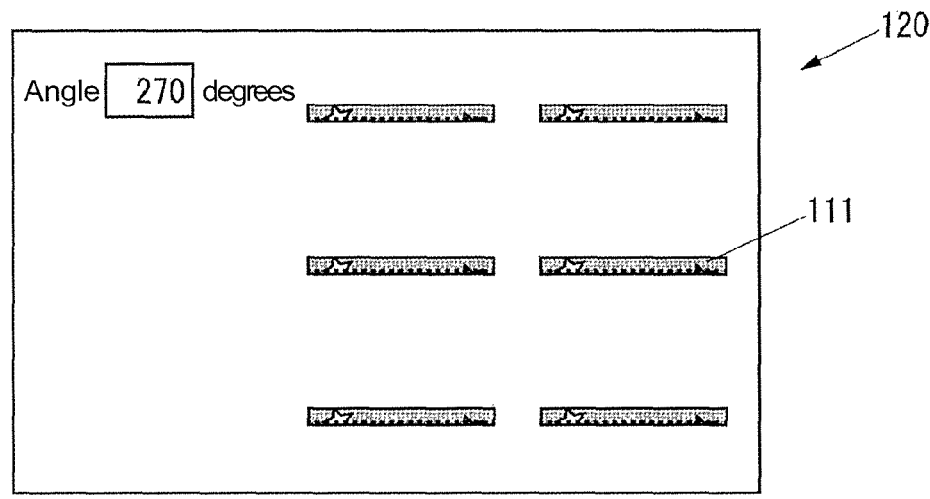
FIG. 10B is a diagram showing an example of an angle-specific print preview screen displayed on the display section shown in FIG. 6 in a case where the designated angle is 270 degrees.
Figure 10C:
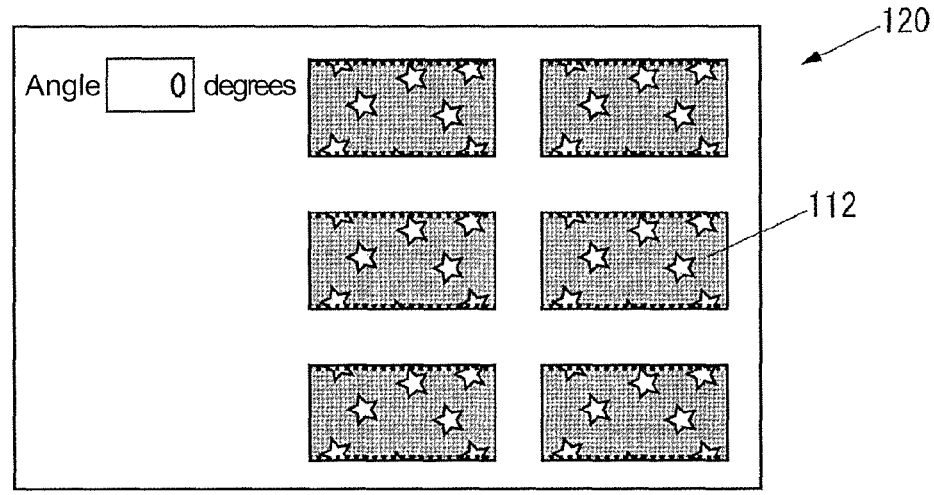
FIG. 10C is a diagram showing an example of an angle-specific print preview screen displayed on the display section shown in FIG. 6 in a case where the designated angle is 0 degrees.

In a case where the program 64*a* for printing on a three-dimensional object is being activated, the control section 65 of the computer 60 displays an angle-specific print preview screens 120 shown in FIG. 10A to FIG. 10C on the display section 62 in accordance with instructions via the operation section 61.

FIG. 10A is a diagram showing an example of the angle-specific print preview screen 120 displayed on the display section 62 in the case where the designated angle is 90 degrees. FIG. 10B is a diagram showing an example of the angle-specific print preview screen 120 displayed on the display section 62 in the case where the designated angle is 270 degrees. FIG. 10C is a diagram showing an example of the angle-specific print preview screen 120 displayed on the display section 62 in the case where the designated angle is 0 degrees.

Of the designated angle that is designated in the first divided image angle spin box 103*b*, the designated angle that is designated in the second divided image angle spin box 103*d*, and the designated angle that is designated in the third divided image angle spin box 103*f*, the control section 65 displays the angle-specific print preview screen 120 for the angle selected via the operation section 61 on the display section 62. The angle-specific print preview screen 120 can allow the user to recognize how the respective divided images look like in the case of printing on the three-dimensional objects 90 attached to six three-dimensional object supporting sections 33.

It should be noted that, the print condition receiving screen 100 shown in FIG. 8 may include a GUI (Graphical User Interface) for setting whether or not to round off corners for each of four corners of the respective divided images, and setting a radius of the rounded corners.

Figure 11:
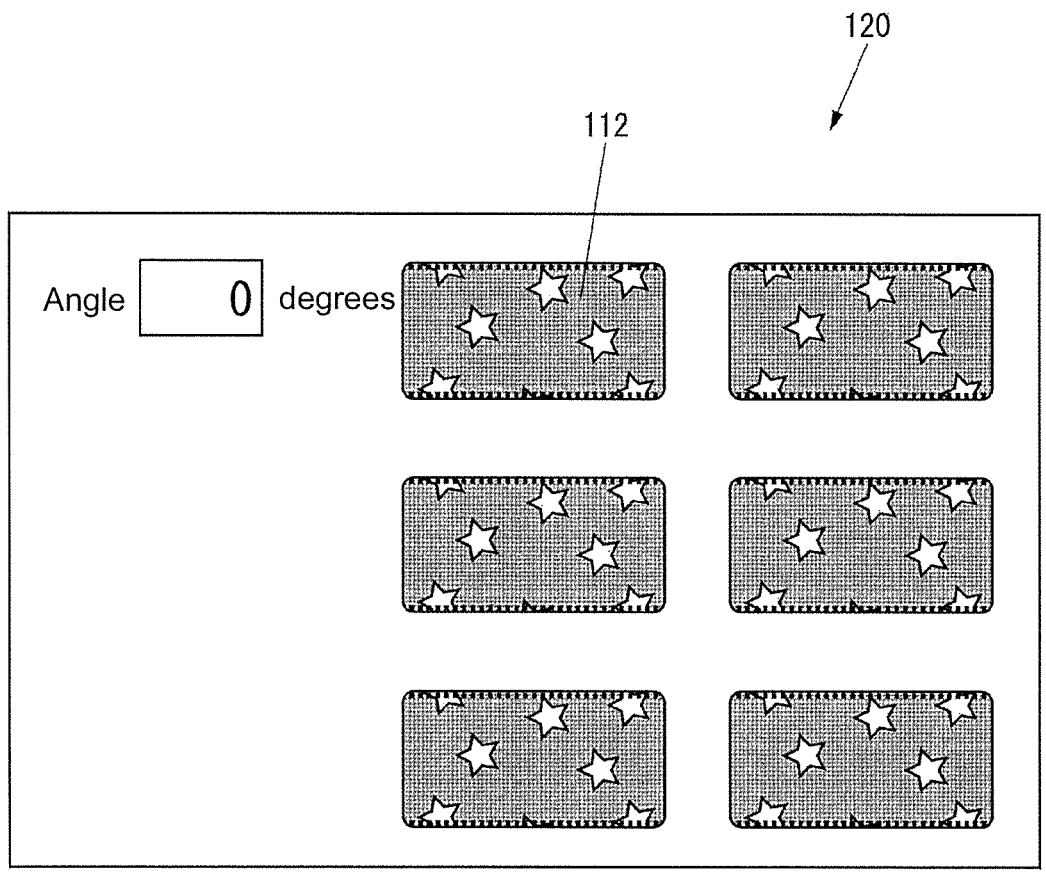
FIG. 11 is a diagram showing an example of an angle-specific print preview screen displayed on the display section shown in FIG. 6 in the case where the designated angle is 0 degrees, and is a diagram showing an example different from the example shown in FIG. 10C.

FIG. 11 is a diagram showing an example of the angle-specific print preview screen 120 displayed on the display section 62 in the case where the designated angle is 0 degrees, and is a diagram showing a different example from the example shown in FIG. 10C.

For example, in the case of being set to round off the four corners of the second divided image 112, in the generation of the print data in S203 of FIG. 7, the second divided image 112 as shown in FIG. 11 is generated. If the corners of print surfaces of the three-dimensional object 90 are rounded corners, when divided images with right angled corners are printed on the print surfaces thereof, ink may be forced out over the corners of the printing surfaces of the three-dimensional object 90 upon printing, whereby the three-dimensional object 90, the three-dimensional object supporting device 30 and the like may be contaminated. However, in the case where the corners of the printing surfaces of the three-dimensional object 90 are rounded, the possibility that the three-dimensional object 90, the three-dimensional object supporting device 30 and the like are contaminated by the ink forced out from the corners of the printing surfaces of the three-dimensional object 90 upon printing may be reduced by printing the divided images having their corners rounded similarly on the printing surfaces.

Next, the generation of the print data in S203 of FIG. 7 will be described.

In the generation of the print data in S203, the image accepting section 65*a* of the control section 65 accepts the print image as aforementioned.

Further, in the generation of the print data in S203, the image dividing section 65*b* of the control section 65 divides the print image accepted by the image accepting section 65*a* in association with each of the designated angles, and sets the divided images to the designated angles, as aforementioned.

Further, in the generation of the print data in S203, the orthogonal-direction position setting section 65*c* of the control section 65 sets the orthogonal-direction setting positions to the designated angles.

Figure 12A:
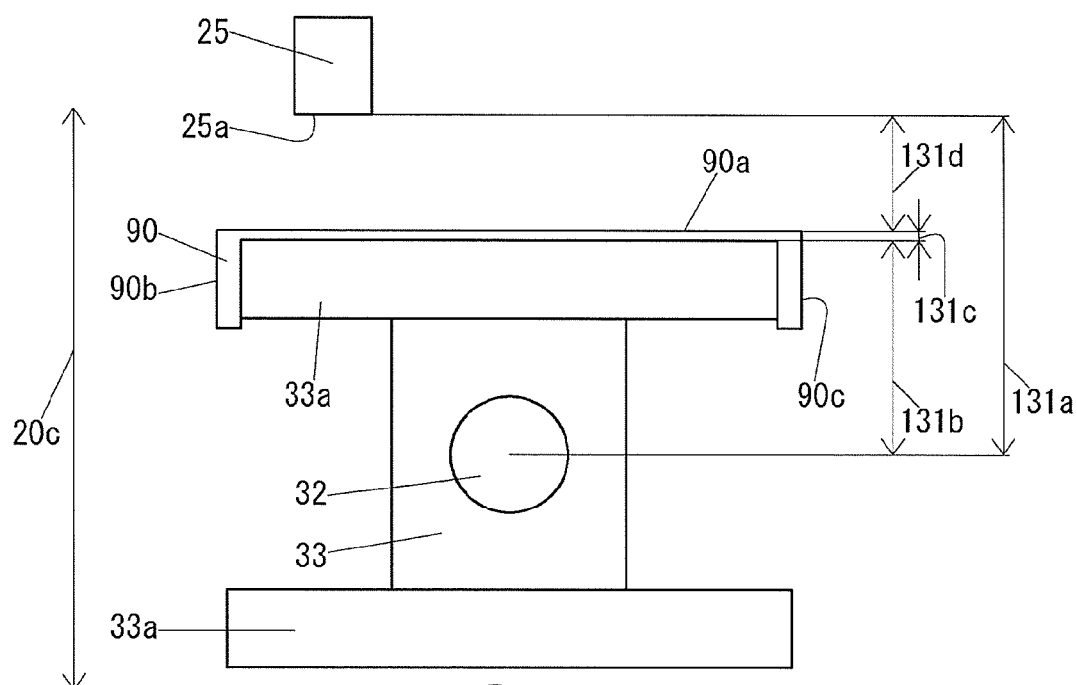
FIG. 12A is a diagram for explaining a method of setting orthogonal-direction setting positions by an orthogonal-direction position setting section shown in FIG. 6, and is a side view in a vicinity of a recording head in a case where an angle of rotation of a shaft member is 0 degrees.
Figure 12B:
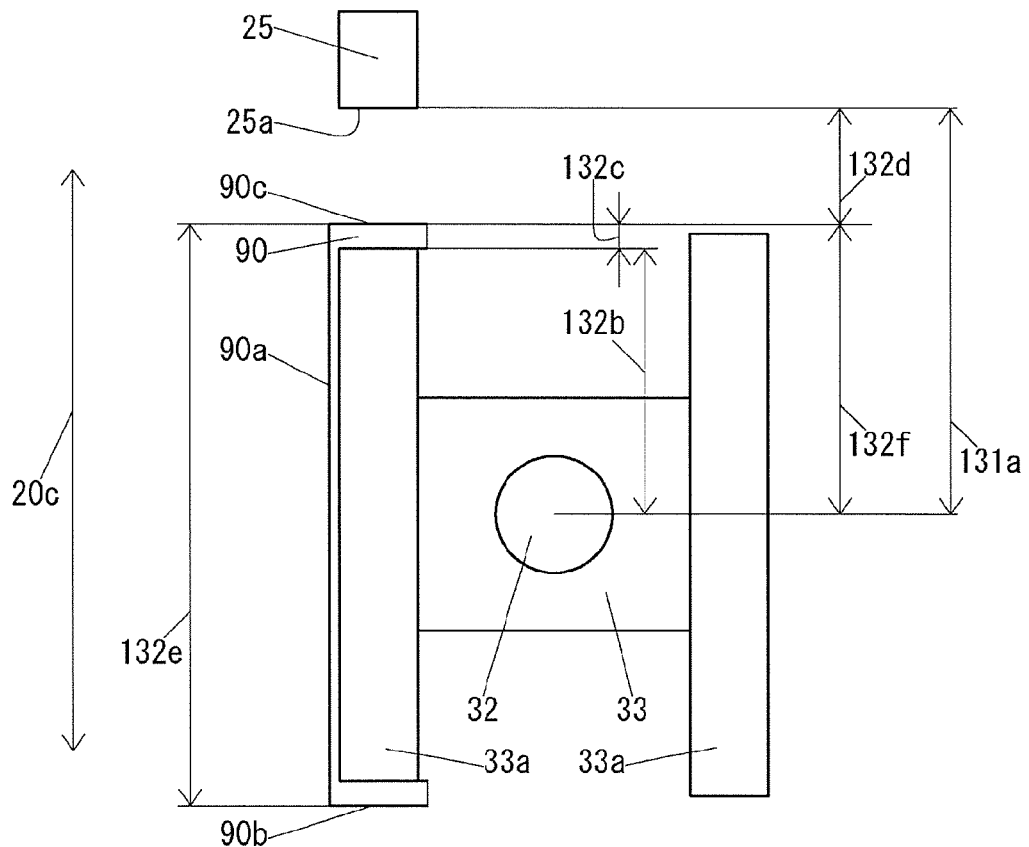
FIG. 12B is a diagram for explaining a method of setting orthogonal-direction setting positions by the orthogonal-direction position setting section shown in FIG. 6, and is a side view in the vicinity of the recording head in a case where the angle of rotation of the shaft member is 90 degrees.

FIG. 12A is a diagram for explaining a method for setting the orthogonal-direction setting positions by the orthogonal-direction position setting section 65*c*, and is a side view in a vicinity of the recording heads 25 in the case where the rotation angle of the shaft members 32 is 0 degrees. FIG. 12B is a diagram for explaining the method for setting the orthogonal-direction setting positions by the orthogonal-direction position setting section 65*c*, and is a side view in the vicinity of the recording heads 25 in the case where the rotation angle of the shaft members 32 is 90 degrees.

As shown in FIG. 12A, in the case where the rotation angle of the shaft members 32 is 0 degrees, a distance 131a in the direction shown by the arrow 20c from a center axis of a shaft member 32 to a nozzle surface 25a of a recording head 25 is a sum of a distance 131b in the direction shown by the arrow 20c from the center axis of the shaft member 32 to an attaching surface of the three-dimensional object attaching section 33a for the main surface 90a of the three-dimensional object 90, a thickness 131c of the main surface part 90a of the three-dimensional object 90 attached to the three-dimensional object attaching section 33a, and a distance 131d in the direction shown by the arrow 20c from the main surface part 90a of the three-dimensional object 90 to the nozzle surface 25a of the recording head 25. Here, the distance 131a is a value that is changed in accordance with settings of the orthogonal-direction setting positions. Further, the distance 131b is a constant value in accordance with the three-dimensional object supporting sections 33. Further, since the thickness 131c is one of parameters of the size of the three-dimensional object 90, it is a value that can be inputted via the operation section 61, for example. Accordingly, in the case where the rotation angle of the shaft members 32 is 0 degrees, the orthogonal-direction position setting section 65c can suitably set the orthogonal-direction setting positions based on the thickness 131c being one of the parameters of the size of the three-dimensional object 90 inputted from outside, so that the distance 131d in the direction shown by the arrow 20c from the main surface part 90a of the three-dimensional object 90 to the nozzle surface 25a of the recording head 25 becomes a suitable distance for ink flying in the inkjet printer 20 (for example, 2 mm).

Further, as shown in FIG. 12B, in the case where the rotation angle of the shaft members 32 is 90 degrees, the distance 131a in the direction shown by the arrow 20c from the center axis of the shaft member 32 to the nozzle surface 25a of the recording head 25 is a sum of the distance 132b in the direction shown by the arrow 20c from the center axis of the shaft member 32 to an attaching surface of the three-dimensional object attaching section 33a for the second side surface part 90c of the three-dimensional object 90, a thickness 132c of the second side surface part 90c of the three-dimensional object 90 attached to the three-dimensional object attaching section 33a, and a distance 132d in the direction shown by the arrow 20c from the second side surface part 90c of the three-dimensional object 90 to the nozzle surface 25a of the recording head 25. Here, the distance 131a is a value that is changed in accordance with settings of the orthogonal-direction setting positions. Further, the distance 132b is a constant value in accordance with the three-dimensional object supporting sections 33. Further, since the thickness 132c is one of the parameters of the size of the three-dimensional object 90, it is a value that can be inputted via the operation section 61, for example. Accordingly, in the case where the rotation angle of the shaft members 32 is 90 degrees, the orthogonal-direction position setting section 65c can suitably set the orthogonal-direction setting positions based on the thickness 132c being one of the parameters of the size of the three-dimensional object 90 inputted from outside, so that the distance 132d in the direction shown by the arrow 20c from the second side surface part 90c of the three-dimensional object 90 to the nozzle surface 25a of the recording head 25 becomes a suitable distance for ink flying in the inkjet printer 20. It should be noted that in the case where the rotation angle of the shaft members 32 is 90 degrees, a sum of a distance 132f being half a length 132e in the direction shown by the arrow 20c of the main surface part 90a of the three-dimensional object 90 attached to the three-dimensional object attaching section 33a and the distance 132d can also be regarded as the distance 131a. Here, since the length 132e is one of the parameters of the size of the three-dimensional object 90, it is a value that can be inputted via the operation section 61, for example. Accordingly, in the case where the rotation angle of the shaft members 32 is 90 degrees, the orthogonal-direction position setting section 65c can suitably set the orthogonal-direction setting positions based on the length 132e being one of the parameters of the size of the three-dimensional object 90 inputted from outside so that the distance 132d in the direction shown by the arrow 20c from the second side surface part 90c of the three-dimensional object 90 to the nozzle surface 25a of the recording head 25 becomes a suitable distance for ink flying in the inkjet printer 20.

In the above, the case where the rotation angle of the shaft members 32 is 0 degrees and the case where the rotation angle of the shaft members 32 is 90 degrees have been described. However, similarly, also in cases where the rotation angle of the shaft members 32 is an angle other than 0 degrees or 90 degrees, the orthogonal-direction position setting section 65c can suitably set the orthogonal-direction setting positions based on the size of the three-dimensional object 90 inputted from outside so that the distance in the direction shown by the arrow 20c from the three-dimensional object 90 to the nozzle surface 25a of the recording head 25 becomes a suitable distance for ink flying in the inkjet printer 20. That is, the orthogonal-direction position setting section 65c can set the orthogonal-direction setting positions for the designated angles based on the size of the three-dimensional object 90 inputted from outside and the designated angles.

In the generation of the print data in S203, the parallel-direction position setting section 65d of the control section 65 sets the parallel-direction setting position to the designated angles.

Figure 13A:
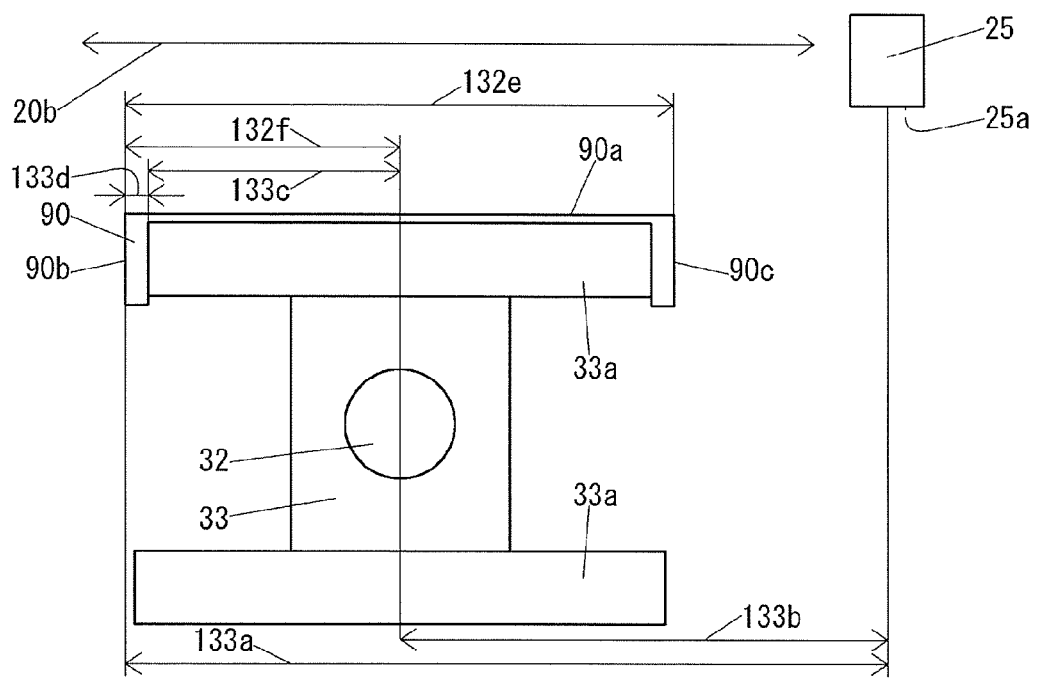
FIG. 13A is a diagram for explaining a method of setting parallel-direction setting positions by a parallel-direction position setting section shown in FIG. 6, and is a side view in the vicinity of the recording head in the case where the angle of rotation of the shaft member is 0 degrees.
Figure 13B:
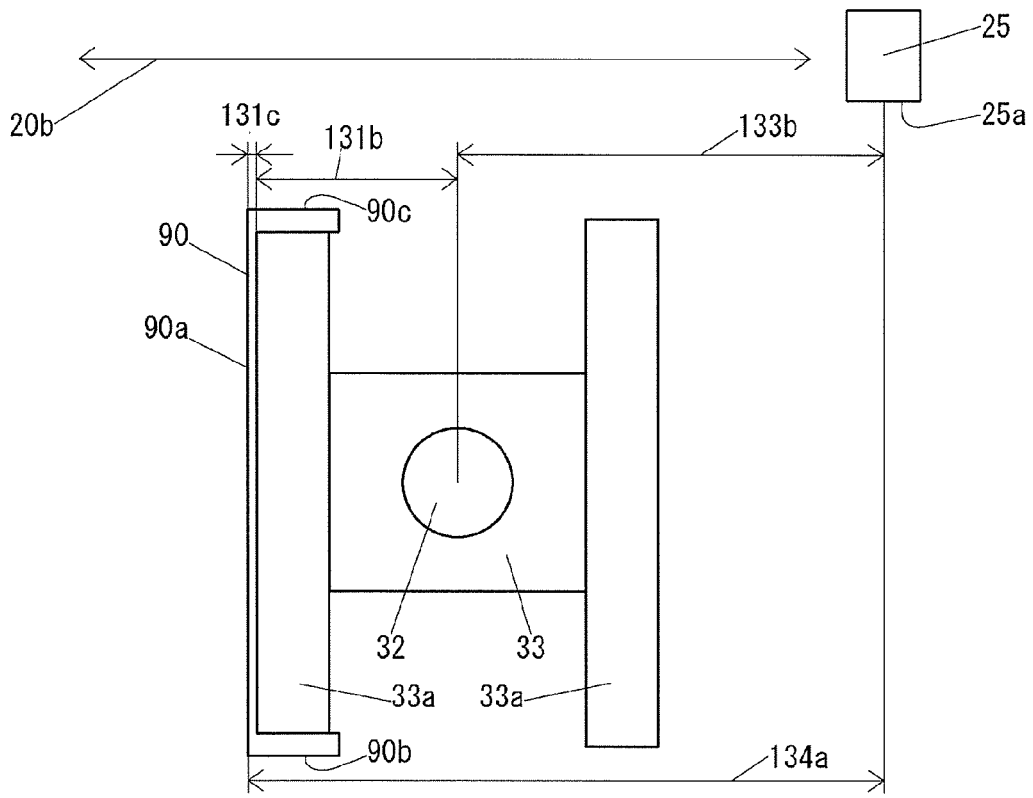
FIG. 13B is a diagram for explaining the method of setting the parallel-direction setting positions by the parallel-direction position setting section shown in FIG. 6, and is a side view in the vicinity of the recording head in the case where the angle of rotation of the shaft member is 90 degrees.

FIG. 13A is a diagram for explaining a method of setting parallel-direction setting positions by the parallel-direction position setting section 65d, and is a side view in the vicinity of the recording head 25 in the case where the angle of rotation of the shaft members 32 is 0 degrees. FIG. 13B is a diagram for explaining a method of setting parallel-direction setting positions by the parallel-direction position setting section 65d, and is a side view in the vicinity of the recording head 25 in the case where the angle of rotation of the shaft members 32 is 90 degrees.

As shown in FIG. 13A, in the case where the rotation angle of the shaft members 32 is 0 degrees, a distance 133a in the sub scanning direction shown by the arrow 20b from an end that is farthest from a center of the nozzle surface 25a of the recording head 25 and the center of the nozzle surface 25a of the recording head 25 in the main surface part 90a of the three-dimensional object 90 in the sub scanning direction shown by the arrow 20b is a sum of a distance 133b in the sub scanning direction shown by the arrow 20b from the center axis of the shaft member 32 to the center of the nozzle surface 25a of the recording head 25, a distance 133c in the sub scanning direction shown by the arrow 20b from the center axis of the shaft member 32 to an attaching surface of the three-dimensional object attaching section 33a for the first side surface part 90b of the three-dimensional object 90, and a thickness 133d of the first side surface part 90b of the three-dimensional object 90 attached to the three-dimensional object attaching section 33a. Here, the distance 133b is a value that is changed in accordance with settings of the parallel-direction setting positions. Further, the distance 133c is a constant value in accordance with the three-dimensional object supporting sections 33. Further, since the thickness 133d is one of the parameters of the size of the three-dimensional object 90, it is a value that can be inputted via the operation section 61, for example. Accordingly, in the case where the rotation angle of the shaft members 32 is 0 degrees, the parallel-direction position setting section 65d can suitably set the parallel-direction setting positions based on the thickness 133d being one of the parameters of the size of the three-dimensional object 90 inputted from outside, so that the main surface part 90a of the three-dimensional object 90 and the recording heads 25 are suitably positioned in the sub scanning direction shown by the arrow 20b upon printing an image of the main surface of the three-dimensional object 90. It should be noted that in the case where the rotation angle of the shaft members 32 is 0 degrees, a sum of a distance 132f being half the length 132e in the sub scanning direction shown by the arrow 20b of the main surface part 90a of the three-dimensional object 90 attached to the three-dimensional object attaching section 33a and the distance 133b can also be regarded as the distance 133a. Here, since the length 132e is one of the parameters of the size of the three-dimensional object 90, it is a value that can be inputted via the operation section 61, for example. Accordingly, in the case where the rotation angle of the shaft members 32 is 0 degrees, the parallel-direction position setting section 65d can suitably set the parallel-direction setting positions based on the length 132e being one of the parameters of the size of the three-dimensional object 90 inputted from outside, so that the main surface part 90a of the three-dimensional object 90 and the recording heads 25 are suitably positioned in the sub scanning direction shown by the arrow 20b upon printing an image of the main surface of the three-dimensional object 90.

As shown in FIG. 13B, in the case where the rotation angle of the shaft members 32 is 90 degrees, a distance 134a in the sub scanning direction shown by the arrow 20b from the end that is the farthest from the center of the nozzle surface 25a of the recording head 25 and the center of the nozzle surface 25a of the recording head 25 in the second side surface part 90c of the three-dimensional object 90 in the sub scanning direction shown by the arrow 20b is a sum of a distance 133b in the sub scanning direction shown by the arrow 20b from the center axis of the shaft member 32 to the center of the nozzle surface 25a of the recording head 25, a distance 131b from the center axis of the shaft member 32 to an attaching surface of the three-dimensional object attaching section 33a for the main surface part 90a of the three-dimensional object 90, and a thickness 131c of the main surface part 90a of the three-dimensional object 90 attached to the three-dimensional object attaching section 33a. Here, the distance 133b is a value that is changed in accordance with settings of the parallel-direction setting positions. Further, the distance 131b is a constant value in accordance with the three-dimensional object supporting sections 33. Further, since the thickness 131c is one of parameters of the size of the three-dimensional object 90, it is a value that can be inputted via the operation section 61, for example. Accordingly, in the case where the rotation angle of the shaft members 32 is 90 degrees, the parallel-direction position setting section 65d can suitably set the parallel-direction setting positions based on the thickness 131c being one of the parameters of the size of the three-dimensional object 90 inputted from outside, so that the second side surface part 90c of the three-dimensional object 90 and the recording heads 25 are suitably positioned in the sub scanning direction shown by the arrow 20b upon printing an image on the second side surface of the three-dimensional object 90.

In the above, the case where the rotation angle of the shaft members 32 is 0 degrees and the case where the rotation angle of the shaft members 32 is 90 degrees have been described. However, similarly, also for cases where the rotation angle of the shaft members 32 is an angle other than 0 degrees or 90 degrees, the parallel-direction position setting section 65d can suitably set the parallel-direction setting positions based on the size of the three-dimensional object 90 inputted from outside, so that the three-dimensional object 90 and the recording heads 25 are suitably positioned in the sub scanning direction shown by the arrow 20b upon printing images on the three-dimensional object 90. That is, the parallel-direction position setting section 65d can set the parallel-direction setting positions for the designated angles based on the size of the three-dimensional object 90 inputted from outside and the designated angles.

In the generation of the print data in S203, the control section 65 generates print data including the divided image set to the designated angle by the image dividing section 65b, the orthogonal-direction setting position set to the designated angle by the orthogonal-direction position setting section 65c, and the parallel-direction setting position set to the designated angle by the parallel-direction position setting section 65d, for each of the designated angles.

Next, an operation of the inkjet printer 20 in the case of executing print on the three-dimensional object 90 based on the print data sent from the computer 60 will be described.

The print control section 46a of the control section 46 of the inkjet printer 20 executes printing on the three-dimensional object 90 based on the print data for each of the designated angles received via the communication section 44.

Firstly, the print control section 46a controls the stepping motor 35 so that the rotation angle of the shaft members 32 comes to be the designated angle included in the print data. Due to this, the angle of the three-dimensional objects 90 relative to the nozzle surfaces 25a of the recording heads 25 is changed.

Next, the print control section 46a controls the stage driving section 41 based on the orthogonal-direction setting position included in the print data to suitably change the relative positions of the recording heads 25 and the three-dimensional object supporting device 30. Accordingly, the distance in the direction shown by the arrow 20c from the three-dimensional object 90 that was preliminarily attached to the three-dimensional object supporting device 30 by the user to the nozzle surfaces 25a of the recording heads 25 becomes a distance suitable for ink flying in the inkjet printer 20.

Next, the print control section 46a prints the divided image included in the print data, by controlling the recording heads 25, the main body driving section 42, and the carriage driving section 43 based on the print data, on the three-dimensional objects 90 attached to the three-dimensional object supporting device 30. Here, the print control section 46a suitably changes the positions of the three-dimensional object 90 and the nozzle surfaces 25a of the recording heads 25 in the sub scanning direction shown by the arrow 20b by controlling the main body driving section 42 while suitably managing the distance in the sub scanning direction shown by the arrow 20b between the three-dimensional objects 90 and the nozzle surfaces 25a of the recording heads 25 based on the parallel-direction setting position included in the print data.

The print control section 46*a* sequentially executes the aforementioned series of processes for each of the print data for the designated angles.

Figure 14A:
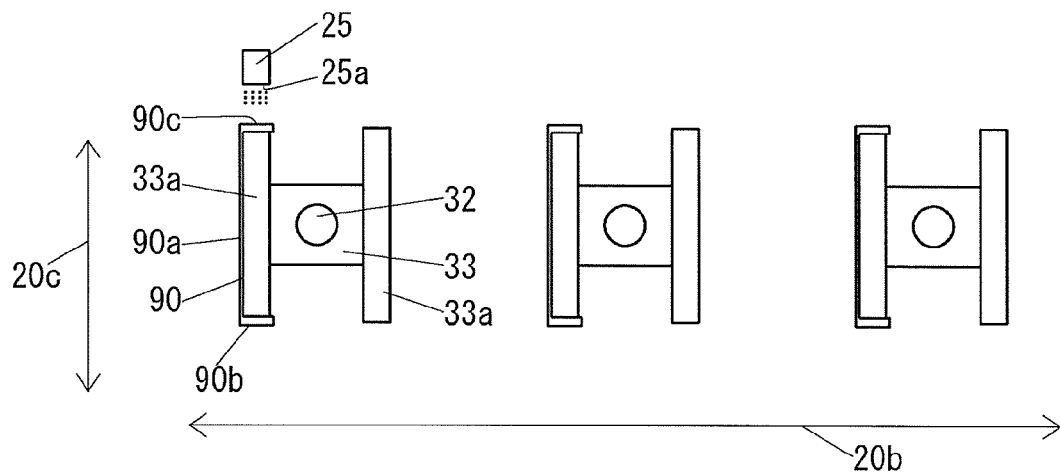
FIG. 14A is a side view in the vicinity of the recording head in a state where printing is performed on the three-dimensional object when the angle of rotation of the shaft member is 90 degrees, in a case where the three-dimensional object is attached to only one of two three-dimensional object attaching sections of a three-dimensional object supporting section shown in FIG. 4.
Figure 14B:
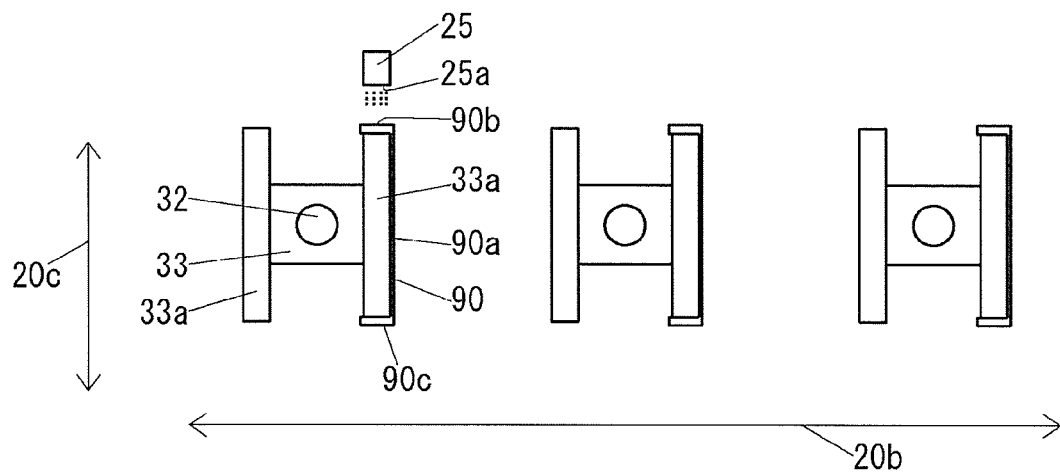
FIG. 14B is a side view in the vicinity of the recording head in a state where printing is performed on the three-dimensional object when the angle of rotation of the shaft member is 270 degrees, in the case where the three-dimensional object is attached to only one of the two three-dimensional object attaching sections of the three-dimensional object supporting section shown in FIG. 4.
Figure 14C:
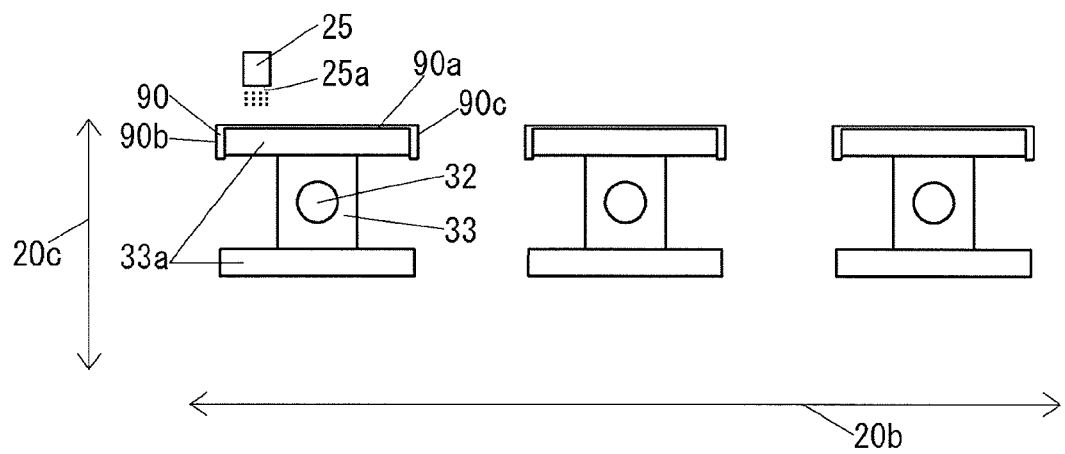
FIG. 14C is a side view in the vicinity of the recording head in a state where printing is performed on the three-dimensional object when the angle of rotation of the shaft member is 0 degrees, in the case where the three-dimensional object is attached to only one of the two three-dimensional object attaching sections of the three-dimensional object supporting section shown in FIG. 4.

FIG. 14A is a side view in the vicinity of the recording head 25 in a state where printing is being performed on the three-dimensional object 90 when the angle of rotation of the shaft member 32 is 90 degrees, in the case where the three-dimensional object 90 is attached to only one of the two three-dimensional object attaching sections 33*a* of the three-dimensional object supporting section 33. FIG. 14B is a side view in the vicinity of the recording head 25 in a state where printing is being performed on the three-dimensional object 90 when the angle of rotation of the shaft member 32 is 270 degrees, in the case where the three-dimensional object 90 is attached to only one of the two three-dimensional object attaching sections 33*a* of the three-dimensional object supporting section 33. FIG. 14C is a side view in the vicinity of the recording head 25 in a state where printing is being performed on the three-dimensional object 90 when the angle of rotation of the shaft member 32 is 0 degrees, in the case where the three-dimensional object 90 is attached to only one of the two three-dimensional object attaching sections 33*a* of the three-dimensional object supporting section 33.

Based on the print data for each of the designated angle, as received via the communication section 44, the print control section 46*a* performs the printing on the second side surface part 90*c* of the three-dimensional object 90 in the case where the designated angle is 90 degrees as shown in FIG. 14A, the printing on the first side surface part 90*b* of the three-dimensional object 90 in the case where the designated angle is 270 degrees as shown in FIG. 14B, and the printing on the main surface part 90*a* of the three-dimensional object 90 in the case where the designated angle is 0 degrees as shown in FIG. 14C in this order. Accordingly, by executing the printing on the main surface part 90*a* lastly, the print control section 46*a* can improve the print quality on the main surface part 90*a* can be improved by overwriting on the main surface part 90*a* by the final printing on the main surface part 90*a* even if unnecessary ink has adhered to the main surface part 90*a* by the printing on the second side surface part 90*c* and the printing on the first side surface part 90*b*. Such an order of printing is useful in improving the print quality of the main surface part 90*a*, however, it may be changed upon accepting print condition in S202. The order of printing may be set preliminarily in the aforementioned order in accordance with the type of the three-dimensional object 90. For example, the order may be included in the aforementioned template data.

In the above, the example in which a same image is printed on each of the three-dimensional objects 90 attached respectively to the six three-dimensional object supporting sections 33 has been described. However, in a case of receiving a plurality of images in S201, the computer 60 may cause the inkjet printer 20 to print images that are different from one another on the three-dimensional objects 90 attached respectively to the six three-dimensional object supporting sections 33.

Figure 15A:
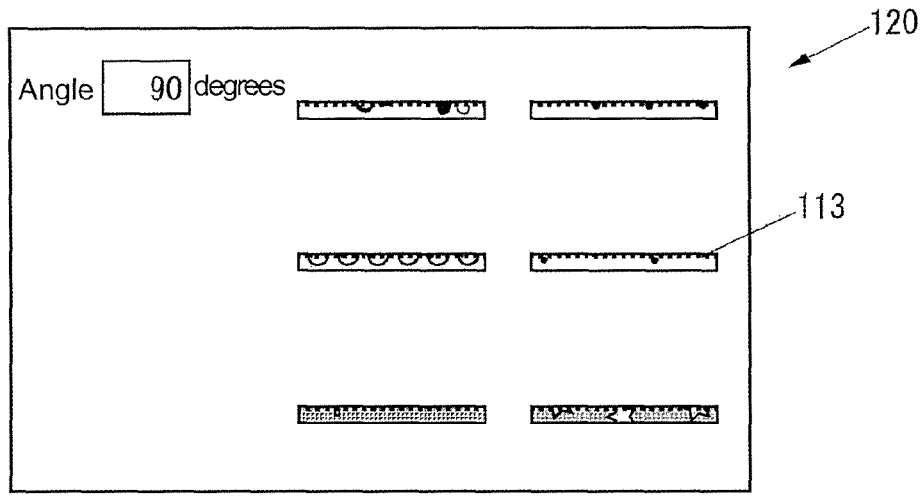
FIG. 15A is a diagram showing an example of the angle-specific print preview screen displayed on the display section shown in FIG. 6 in the case where the designated angle is 90 degrees, and is a diagram showing an example different from the example shown in FIG. 10A.
Figure 15B:
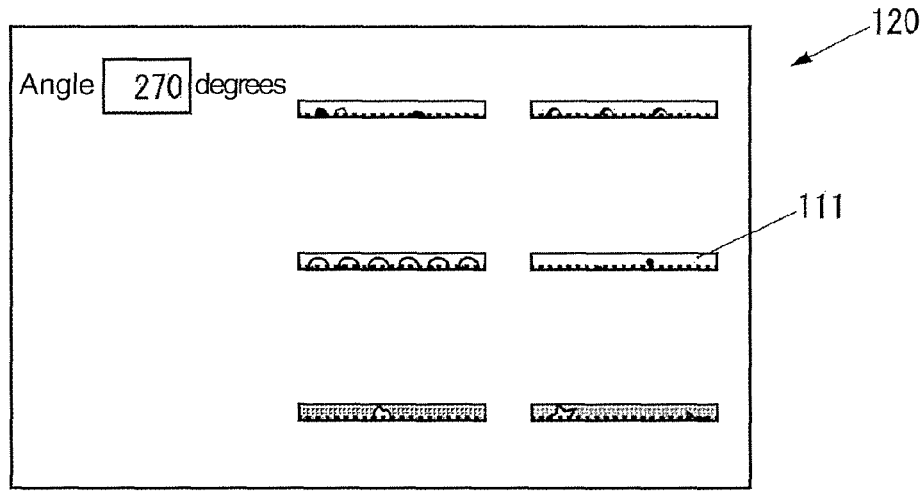
FIG. 15B is a diagram showing an example of the angle-specific print preview screen displayed on the display section shown in FIG. 6 in the case where the designated angle is 270 degrees, and is a diagram showing an example different from the example shown in FIG. 10B.
Figure 15C:
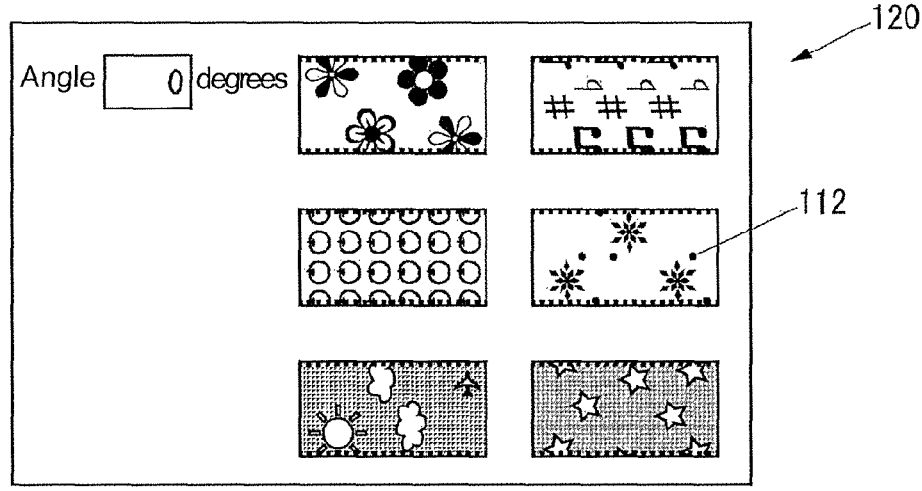
FIG. 15C is a diagram showing an example of the angle-specific print preview screen displayed on the display section shown in FIG. 6 in the case where the designated angle is 0 degrees, and is a diagram showing an example different from the examples shown in FIG. 10C and FIG. 11.

FIG. 15A is a diagram showing an example of the angle-specific print preview screen 120 displayed on the display section 62 in the case where the designated angle is 90 degrees, and is a diagram showing a different example from the example shown in FIG. 10A. FIG. 15B is a diagram showing an example of the angle-specific print preview screen 120 displayed on the display section 62 in the case where the designated angle is 270 degrees, and is a diagram showing a different example from the example shown in FIG. 10B. FIG. 15C is a diagram showing an example of the angle-specific print preview screen 120 displayed on the display section 62 in the case where the designated angle is 0 degrees, and is a diagram showing an example different from the examples shown in FIG. 10C and FIG. 11.

In the case of receiving a plurality of images in S201, the computer 60 can cause the inkjet printer 20 to print images that are different from one another on the three-dimensional objects 90 attached respectively to the six three-dimensional object supporting sections 33, as shown in FIG. 15A to FIG. 15C. Which image is to be printed on which of the three-dimensional objects 90 can be set upon the receipt of the print condition in S202. In the case of printing the images that are different from one another on the three-dimensional objects 90 attached respectively to the six three-dimensional object supporting sections 33, the system 10 for printing on a three-dimensional object can generate a plurality of three-dimensional objects 90 with different designs of images being printed at a time.

In the above, the printing in the case where the number of division is "3" in the dividing number spin box 102 has been described. However, the number of division designated in the dividing number spin box 102 can be a number other than "3".

Figure 16A:
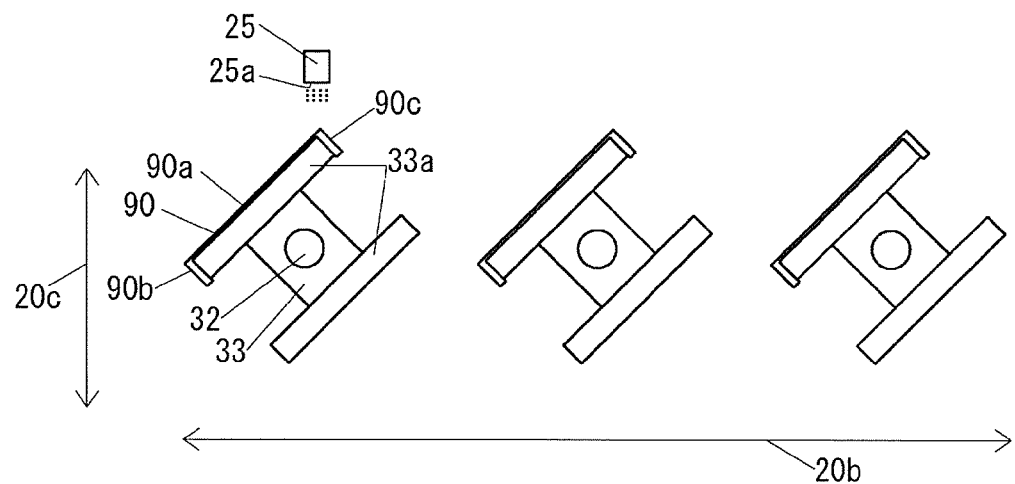
FIG. 16A is a side view in the vicinity of the recording head in a state where printing is being performed on the three-dimensional object when the angle of rotation of the shaft member is 45 degrees, in the case where the three-dimensional object is attached to only one of the two three-dimensional object attaching sections of the three-dimensional object supporting section shown in FIG. 4.
Figure 16B:
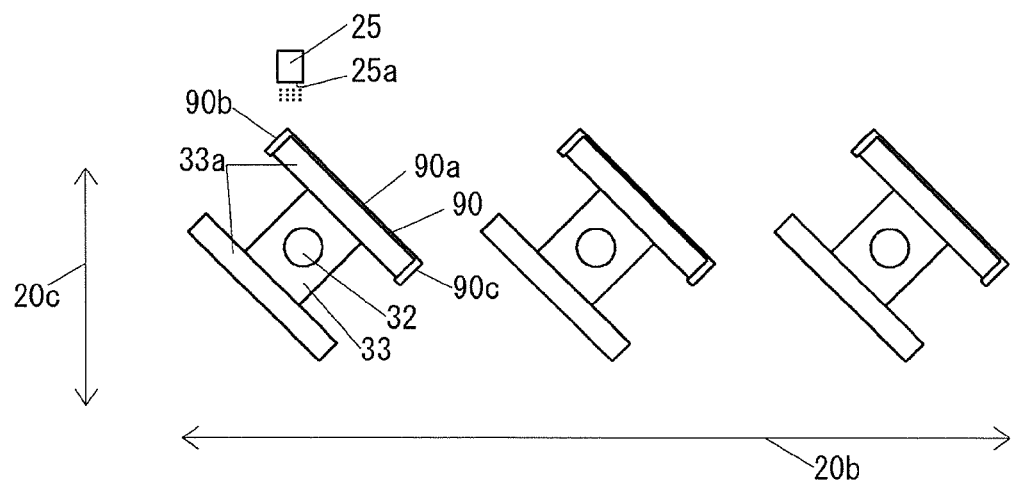
FIG. 16B is a side view in the vicinity of the recording head in a state where printing is being performed on the three-dimensional object when the angle of rotation of the shaft member is 315 degrees, in the case where the three-dimensional object is attached to only one of the two three-dimensional object attaching sections of the three-dimensional object supporting section shown in FIG. 4.

FIG. 16A is a side view in the vicinity of the recording head 25 in a state where printing is being performed on the three-dimensional object 90 when the angle of rotation of the shaft member 32 is 45 degrees, in the case where the three-dimensional object 90 is attached to only one of the two three-dimensional object attaching sections 33*a* of the three-dimensional object supporting section 33. FIG. 16B is a side view in the vicinity of the recording head 25 in a state where printing is being performed on the three-dimensional object 90 when the angle of rotation of the shaft member 32 is 315 degrees, in the case where the three-dimensional object 90 is attached to only one of the two three-dimensional object attaching sections 33*a* of the three-dimensional object supporting section 33.

For example, when the designated angles of rotation of the shaft members 32 in a case where the number of division in the dividing number spin box 102 is designated as "5", and five divided images, in which the print image is divided by "5" being the number of division are to be printed, are respectively 90 degrees, 45 degrees, 0 degrees, 315 degrees, and 270 degrees, the print control section 46*a* of the control section 46 of the inkjet printer 20 performs, based on the print data for each of the designated angles received via the communication section 44, for example, the printing on the second side surface part 90*c* of the three-dimensional object 90 in the case where the designated angle is 90 degrees as shown in FIG. 14A, the printing on the first side surface part 90*b* of the three-dimensional object 90 in the case where the designated angle is 270 degrees as shown in FIG. 14B, the printing on the second side surface part 90*c* and the main surface part 90*a* of the three-dimensional object 90 in the case where the designated angle is 45 degrees as shown in FIG. 16A, the printing on the first side surface part 90*b* and the main surface part 90*a* of the three-dimensional object 90 in the case where the designated angle is 315 degrees as shown in FIG. 16B, and the printing on the main surface part 90*a* of the three-dimensional object 90 in the case where the designated angle is 0 degrees as shown in FIG. 14C, in this order. The system 10 for printing on a three-dimensional object can print images on the three-dimensional objects 90 at more suitable angle with larger number of divisions, so that the print quality on the three-dimensional objects 90 can be improved.

In the above, the printing in the case where the three-dimensional object 90 is attached to only one of the two three-dimensional object attaching sections 33a of the three-dimensional object supporting section 33 has been described. However, the system 10 for printing on a three-dimensional object can perform printing similarly also in the case where the three-dimensional objects 90 are attached to both of the two three-dimensional object attaching sections 33a of the three-dimensional object supporting section 33.

Figure 17A:
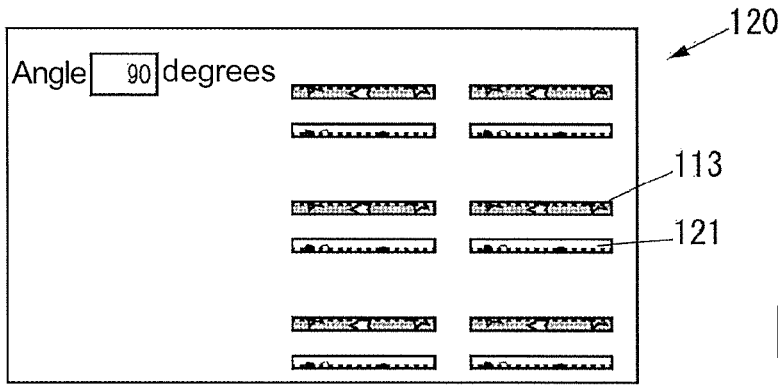
FIG. 17A is a diagram showing an example of the angle-specific print preview screen displayed on the display section shown in FIG. 6 in the case where the designated angle is 90 degrees, and is a diagram showing an example different from the examples shown in FIG. 10A and FIG. 15A.
Figure 17B:
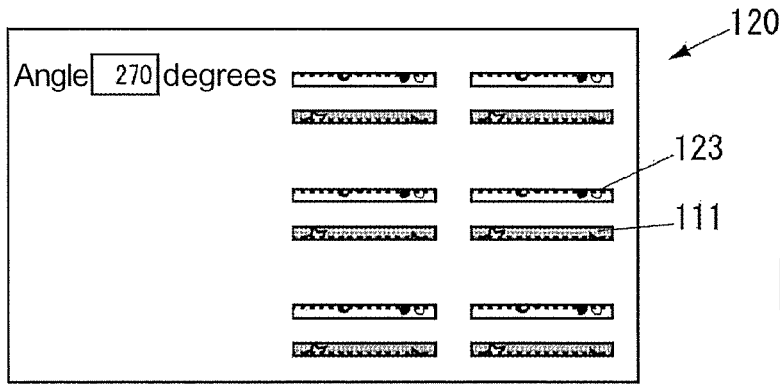
FIG. 17B is a diagram showing an example of the angle-specific print preview screen displayed on the display section shown in FIG. 6 in the case where the designated angle is 270 degrees, and is a diagram showing an example different from the examples shown in FIG. 10B and FIG. 15B.
Figure 17C:
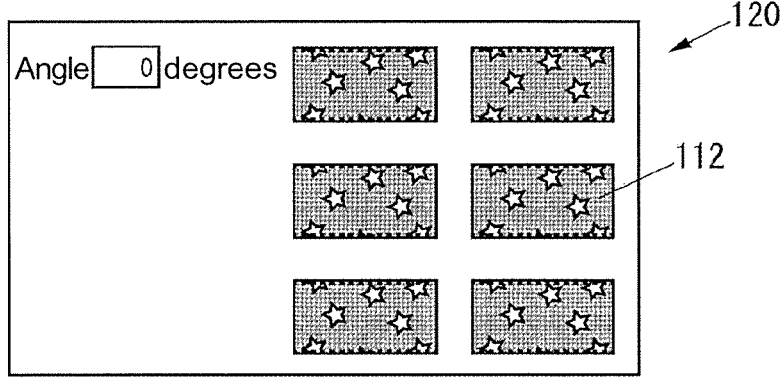
FIG. 17C is a diagram showing an example of the angle-specific print preview screen displayed on the display section shown in FIG. 6 in the case where the designated angle is 0 degrees, and is a diagram showing an example different from the examples shown in FIG. 10C, FIG. 11, and FIG. 15C.
Figure 17D:
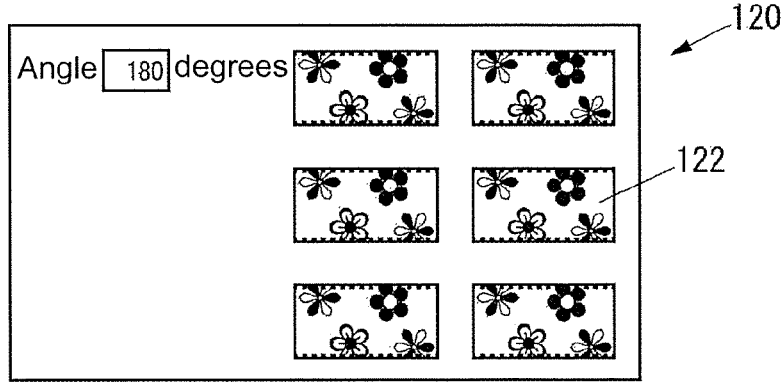
FIG. 17D is a diagram showing an example of the angle-specific print preview screen displayed on the display section shown in FIG. 6 in the case where the designated angle is 180 degrees.

FIG. 17A is a diagram showing an example of the angle-specific print preview screen 120 displayed on the display section 62 in the case where the designated angle is 90 degrees, and is a diagram showing an example different from the examples shown in FIG. 10A and FIG. 15A. FIG. 17B is a diagram showing an example of the angle-specific print preview screen 120 displayed on the display section 62 in the case where the designated angle is 270 degrees, and is a diagram showing an example different from the examples shown in FIG. 10B and FIG. 15B. FIG. 17C is a diagram showing an example of the angle-specific print preview screen 120 displayed on the display section 62 in the case where the designated angle is 0 degrees, and is a diagram showing an example different from the examples shown in FIG. 10C, FIG. 11, and FIG. 15C. FIG. 17D is a diagram showing an example of the angle-specific print preview screen 120 displayed on the display section 62 in the case where the designated angle is 180 degrees.

Figure 18A:
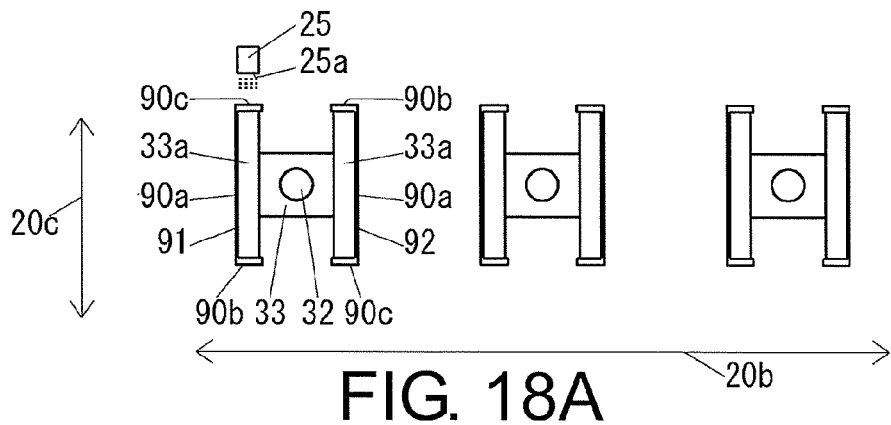
FIG. 18A is a side view in the vicinity of the recording head in a state where printing is being performed on the three-dimensional object when the angle of rotation of the shaft member is 90 degrees, in a case where the three-dimensional object is attached to both of the two three-dimensional object attaching sections of the three-dimensional object supporting section shown in FIG. 4.
Figure 18B:
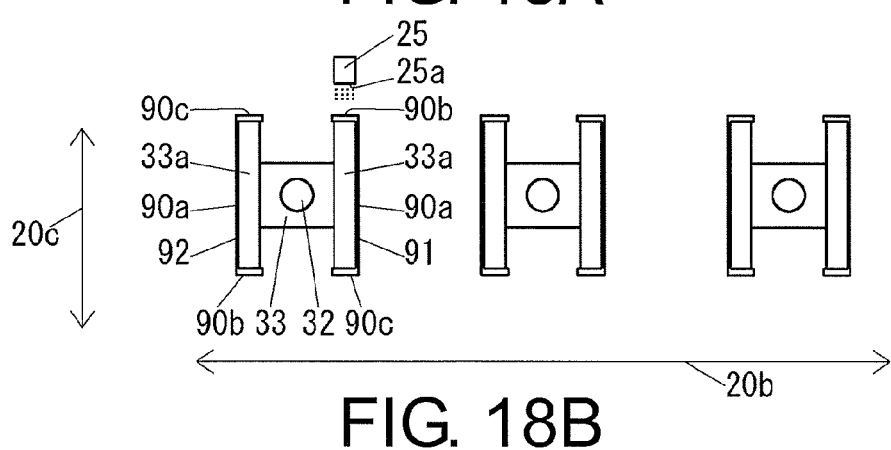
FIG. 18B is a side view in the vicinity of the recording head in a state where printing is being performed on the three-dimensional object when the angle of rotation of the shaft member is 270 degrees, in the case where the three-dimensional object is attached to both of the two three-dimensional object attaching sections of the three-dimensional object supporting section shown in FIG. 4.
Figure 18C:
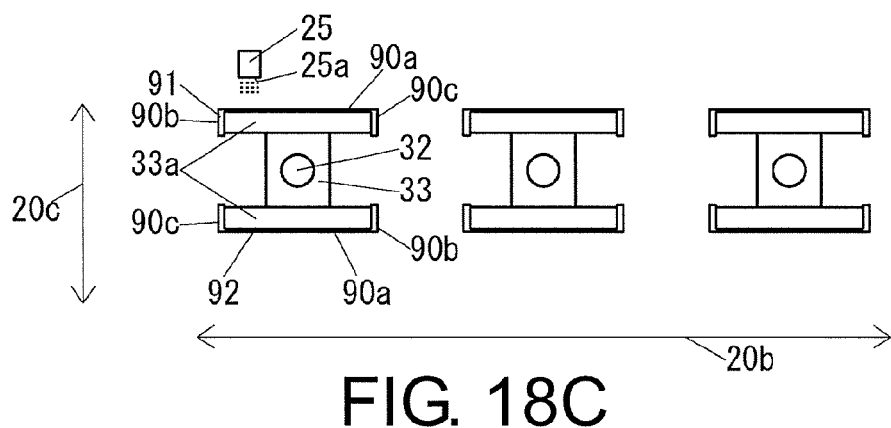
FIG. 18C is a side view in the vicinity of the recording head in a state where printing is being performed on the three-dimensional object when the angle of rotation of the shaft member is 0 degrees, in the case where the three-dimensional object is attached to both of the two three-dimensional object attaching sections of the three-dimensional object supporting section shown in FIG. 4.
Figure 18D:
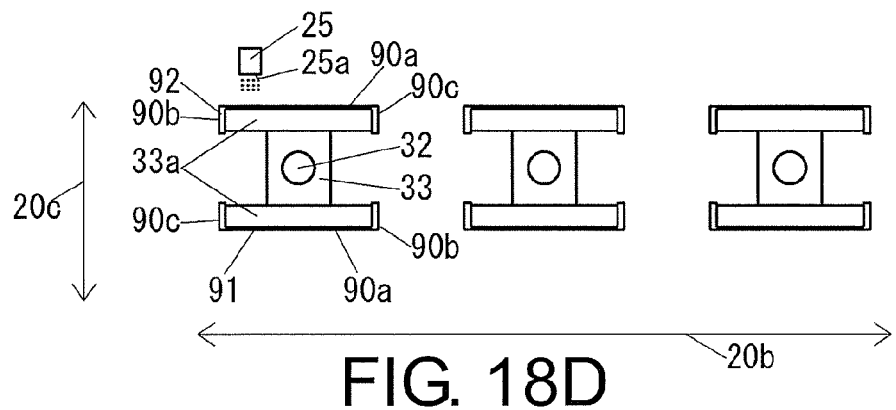
FIG. 18D is a side view in the vicinity of the recording head in a state where printing is being performed on the three-dimensional object when the angle of rotation of the shaft member is 180 degrees, in the case where the three-dimensional object is attached to both of the two three-dimensional object attaching sections of the three-dimensional object supporting section shown in FIG. 4.

FIG. 18A is a side view in the vicinity of the recording head 25 in a state where printing is being performed on the three-dimensional object 90 when the angle of rotation of the shaft member 32 is 90 degrees, in the case where the three-dimensional objects 90 are attached to both of the two three-dimensional object attaching sections 33a of the three-dimensional object supporting section 33. FIG. 18B is a side view in the vicinity of the recording head 25 in a state where printing is being performed on the three-dimensional object 90 when the angle of rotation of the shaft member 32 is 270 degrees, in the case where the three-dimensional objects 90 are attached to both of the two three-dimensional object attaching sections 33a of the three-dimensional object supporting section 33. FIG. 18C is a side view in the vicinity of the recording head 25 in a state where printing is being performed on the three-dimensional object 90 when the angle of rotation of the shaft member 32 is 0 degrees, in the case where the three-dimensional objects 90 are attached to both of the two three-dimensional object attaching sections 33a of the three-dimensional object supporting section 33. FIG. 18D is a side view in the vicinity of the recording head 25 in a state where printing is being performed on the three-dimensional object 90 when the angle of rotation of the shaft member 32 is 180 degrees, in the case where the three-dimensional objects 90 are attached to both of the two three-dimensional object attaching sections 33a of the three-dimensional object supporting section 33.

In the case where the three-dimensional objects 90 are attached to both of the two three-dimensional object attaching sections 33a of the three-dimensional object supporting section 33, the system 10 for printing on a three-dimensional object sets the print condition for the three-dimensional object 90 attached to one of the two three-dimensional object attaching sections 33a of the three-dimensional object supporting section 33 (hereinbelow referred to as "one-side three-dimensional object"), and as for the print condition for the three-dimensional object 90 attached to the other of the two three-dimensional object attaching sections 33a of the three-dimensional object supporting section 33 (hereinbelow referred to as "other-side three-dimensional object"), a designated angle is set by automatically offsetting the same. For example, in the case where the number of division is "3", and the designated angles are 90 degrees, 0 degrees, and 270 degrees, the divided images to be printed on the one-side three-dimensional object are respectively termed a first divided image 111, a second divided image 112, and a third divided image 113, and the divided images to be printed on the other-side three-dimensional object are respectively termed a first divided image 121, a second divided image 122, a third divided image 123, where the angle-specific print preview screen 120 displayed on the display section 62 in the case where the designated angle is 90 degrees, 270 degrees, 0 degrees, or 180 degrees comes to be as the screens shown in FIG. 17A, FIG. 17B, FIG. 17C, and FIG. 17D. In FIG. 17A to FIG. 17D, to make understanding easy, the images to be printed on the one-side three-dimensional objects are configured of the same pattern regardless of the three-dimensional object supporting sections 33, and the images to be printed on the other-side three-dimensional objects are configured of the same pattern regardless of the three-dimensional object supporting sections 33. In the case where the divided images as shown in FIG. 17A to FIG. 17D are set, the print control section 46a of the control section 46 of the inkjet printer 20 performs, based on the print data for each of the designated angles received via the communication section 44, for example the printing on the second side surface part 90c of the one-side three-dimensional object 91 and the first side surface part 90b of the other-side three-dimensional object 92 in the case where the designated angle is 90 degrees as shown in FIG. 18A, the printing on the first side surface part 90b of the one-side three-dimensional object 91 and the second side surface part 90c of the other-side three-dimensional object 92 in the case where the designated angle is 270 degrees as shown in FIG. 18B, the printing on the main surface part 90a of the one-side three-dimensional object 91 in the case where the designated angle is 0 degrees as shown in FIG. 18C, and the printing on the main surface part 90a of the other-side three-dimensional object 92 in the case where the designated angle is 180 degrees as shown in FIG. 18D, in this order. Even in the case where the three-dimensional objects 90 are attached to both of the two three-dimensional object attaching sections 33a of the three-dimensional object supporting section 33, the system 10 for printing on a three-dimensional object can print different images on all of the three-dimensional objects 90, or can print images in any arbitrary number of division.

In the above, as shown in FIG. 2, the description is given of the printing on the three-dimensional object 90 that includes the main surface part 90a where a main surface is formed, the first side surface part 90b where the first side surface being a surface that is substantially orthogonal to the main surface and continued from the main surface is formed, and the second side surface part 90c where the second side surface being a surface that is substantially orthogonal to the main surface and continued from the main surface on an opposite side from the first side surface is formed. However, the system 10 for printing on a three-dimensional object can perform printing on arbitrarily shaped three-dimensional objects.

Figure 19:
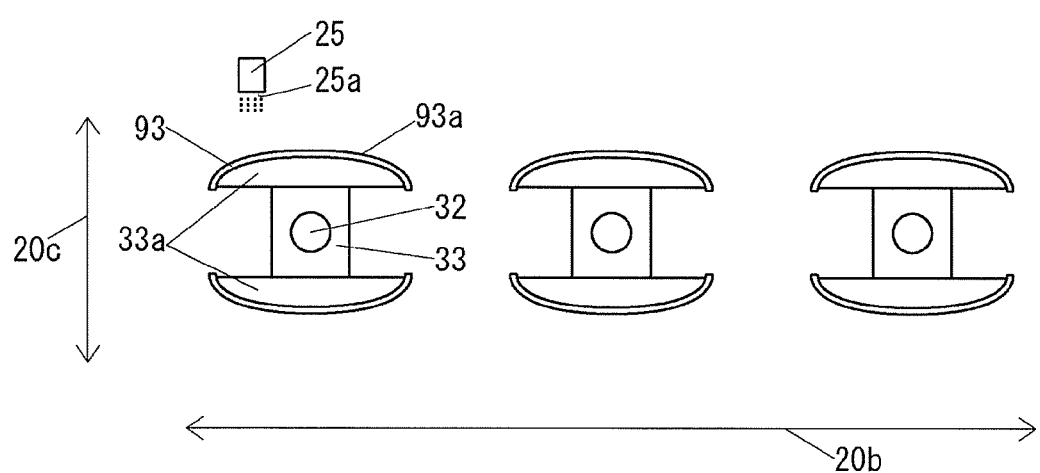
FIG. 19 is a side view in the vicinity of the recording head when the angle of rotation of the shaft member shown in FIG. 4 is 0 degrees, in a state where a three-dimensional object different from the three-dimensional object shown in FIG. 2 is attached to the three-dimensional object supporting section.

FIG. 19 is a side view in the vicinity of the recording head 25 when the angle of rotation of the shaft member 32 is 0 degrees, in a state where a three-dimensional object different from the three-dimensional object 90 shown in FIG. 2 is attached to the three-dimensional object supporting section 33.

For example, the system 10 for printing on a three-dimensional object can perform printing on a surface 93*a* of a three-dimensional object 93 that is wholly formed by a curved surface as shown in FIG. 19. The system 10 for printing on a three-dimensional object can perform printing of the divided images that are obtained by dividing the print image by an arbitrary number on the three-dimensional object 93 also in the case of performing printing on the surface 93*a* of the three-dimensional object 93 that is wholly formed by the curved surface.

As described above, the system 10 for printing on a three-dimensional object of the present invention performs printing by automatically changing the angle of the support of the three-dimensional object 90 with respect to the nozzle surfaces 25*a*, and the image to be printed on the three-dimensional object 90 in the case where the three-dimensional object 90 is supported by the aforesaid angle with respect to the nozzle surfaces 25*a*, so that the printing of images from the plurality of directions on the three-dimensional object 90 can be facilitated compared to in the conventional technique.

Further, the system 10 for printing on a three-dimensional object automatically divides the image to be printed on the three-dimensional object 90 with respect to the plurality of designated angles, so that the printing of images from the plurality of directions on the three-dimensional object 90 can be facilitated compared to in the conventional technique.

Figure 20:
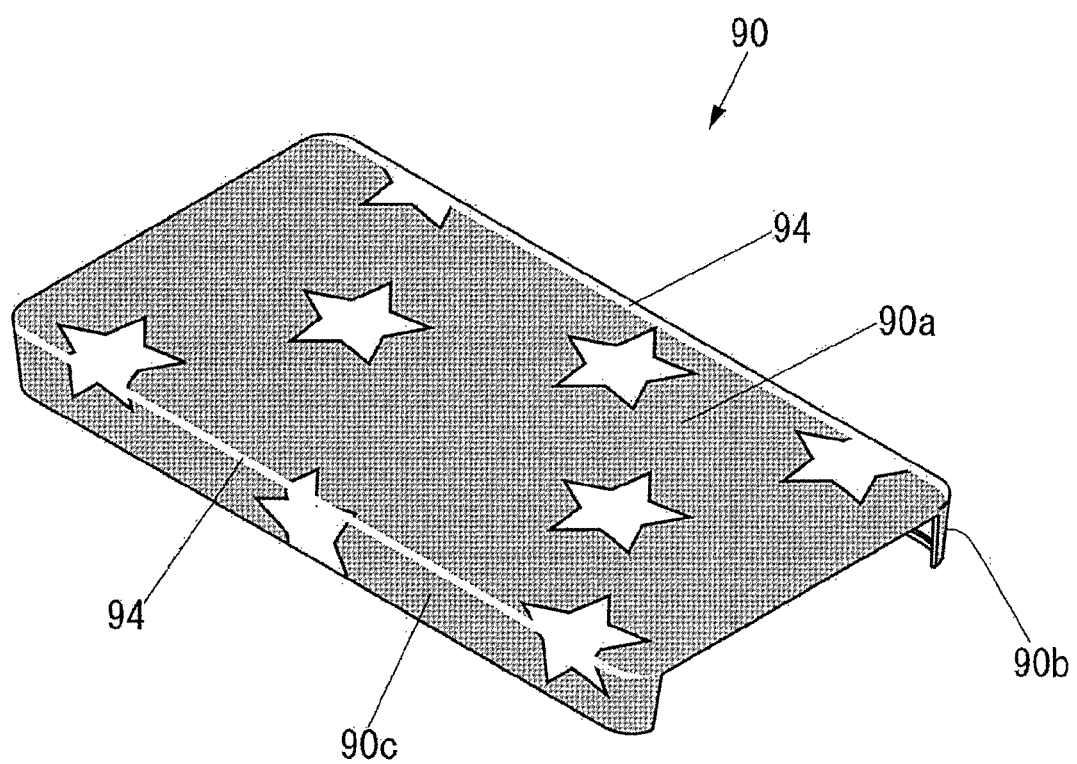
FIG. 20 is an outer perspective view of the three-dimensional object shown in FIG. 2 in a case where adjacent divided images are printed apart from each other.
Figure 21:
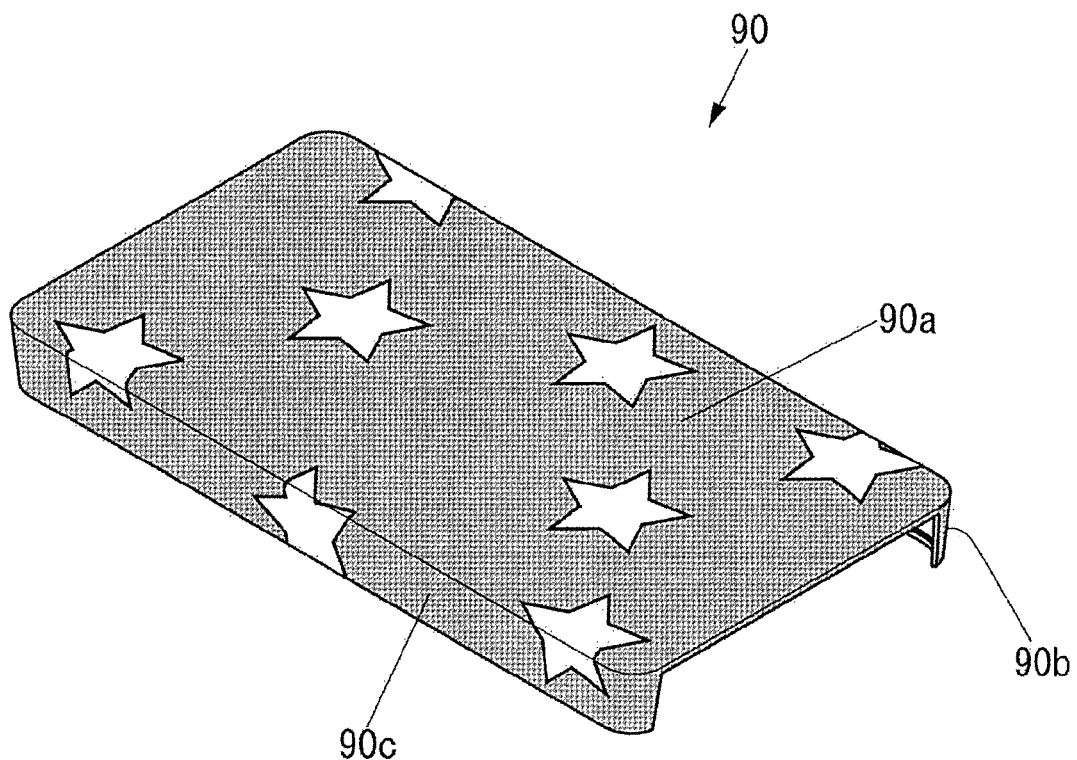
FIG. 21 is an outer perspective view of the three-dimensional object shown in FIG. 2 in a case of being printed with boundary portions of the adjacent divided images being overlapped, in a state where concentration becomes lower toward ends of respective divided images, at the boundary portions of the adjacent divided images.

FIG. 20 is an outer perspective view of the three-dimensional object 90 in a case where adjacent divided images have been printed apart from each other. FIG. 21 is an outer perspective view of the three-dimensional object 90 in a case where boundary portions of the adjacent divided images have been printed while overlapped, in a state where concentration becomes lower toward ends of respective divided images, at the boundary portions of the adjacent divided images.

In the case where the respective divided images are printed on the three-dimensional object 90 with boundary portions of the adjacent divided images not being overlapped, the system 10 for printing on a three-dimensional object has a possibility that the adjacent divided images are printed on the three-dimensional object 90 while they are separated as shown in FIG. 20 due to various errors upon printing, whereby an unnatural dividing line 94 may be generated between the adjacent divided images. However, the system 10 for printing on a three-dimensional object can prevent the adjacent divided images from being printed on the three-dimensional object 90 while they are separated due to various errors upon printing, since the boundary portions of the adjacent divided images are printed by being overlapped on the three-dimensional object 90 as shown in FIG. 9, as a result the generation of the unnatural dividing line 94 between the adjacent divided images can be prevented. Accordingly, the system 10 for printing on a three-dimensional object can improve the print quality on the three-dimensional object 90 as shown in FIG. 21 as compared to the configuration in which the respective divided images are printed on the three-dimensional object 90 with the boundary portions of the adjacent divided images not being overlapped.

Figure 22:
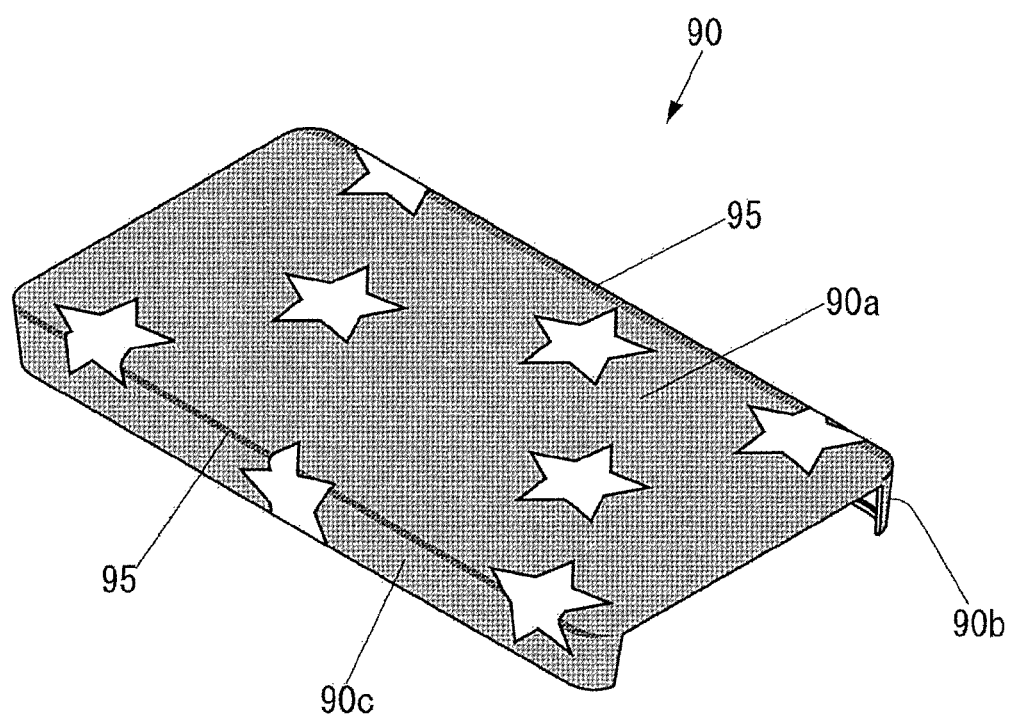
FIG. 22 is an outer perspective view of the three-dimensional object shown in FIG. 2 in a case of being printed with boundary portions of the adjacent divided images being overlapped, in a state where the concentration is not changed, at the boundary portions of the adjacent divided images.

FIG. 22 is an outer perspective view of the three-dimensional object 90 in a case where boundary portions of the adjacent divided images have been printed while overlapped, in a state where the concentration is not changed at the boundary portions of the adjacent divided images.

In a case where the respective divided images are printed on the three-dimensional object 90 with the concentration not being changed at the boundary portions of the adjacent divided images, as shown in FIG. 22, the system 10 for printing on a three-dimensional object has a possibility that an awkward altering line 95 of images may be generated at overlapped portions among the boundary portions of the adjacent divided images, with the respective divided images being printed on the three-dimensional object 90 in a state where the concentrations of the overlapped portions at the boundary portions of the adjacent divided images become extremely dense than other portions. However, since the system 10 for printing on a three-dimensional object prints the respective divided image on the three-dimensional object 90 in the state where the concentration becomes lower toward the end of each divided image at the boundary portions of the adjacent divided images as shown in FIG. 9, the generation of the awkward altering line 95 of images caused by the concentration being extremely denser at the overlapped portions than at other portions within the boundary portions of the adjacent divided images can be prevented. Accordingly, the system 10 for printing on a three-dimensional object can improve the quality of the printing on the three-dimensional object 90 compared to the configuration in which the respective divided images are printed on the three-dimensional object 90 without the concentration being changed at the boundary portions of the adjacent divided image, as shown in FIG. 21.

Further, in the system 10 for printing on a three-dimensional object, the relative positions of the recording heads 25 and the three-dimensional object supporting device 30 in the direction orthogonally intersecting the nozzle surfaces 25*a*, that is, in the direction shown by the arrow 20*c*, are automatically changed to suitable positions according to the size of the three-dimensional object 90 and the designated angle, so that it can facilitate printing of the images from the plurality of directions on the three-dimensional object 90 compared to the configuration in which the user must input the relative positions of the recording heads 25 and the three-dimensional object supporting device 30 in the direction shown by the arrow 20*c* for each of the designated angles. It should be noted that the system 10 for printing on a three-dimensional object may have the configuration in which the relative positions in the direction shown by the arrow 20*c* of the recording heads 25 and the three-dimensional object supporting device 30 must be inputted by the user for each of the designated angles.

Further, in the system 10 for printing on a three-dimensional object, the relative positions of the recording heads 25 and the three-dimensional object supporting device 30 in the direction parallel to the nozzle surfaces 25*a*, that is, in the sub scanning direction shown by the arrow 20*b*, are automatically changed to suitable positions according to the size of the three-dimensional object 90 and the designated angle, so that it can facilitate printing of the images from the plurality of directions on the three-dimensional object 90 compared to the configuration in which the user must input the relative positions of the recording heads 25 and the three-dimensional object supporting device 30 in the sub scanning direction shown by the arrow 20*b* for each of the designated angles. It should be noted that, the system 10 for printing on a three-dimensional object may have the configuration in which the relative positions in the sub scanning direction shown by the arrow 20*b* of the recording heads 25 and the three-dimensional object supporting device 30 must be inputted by the user for each of the designated angles.

The system 10 for printing on a three-dimensional object in the present embodiment performs printing of the images on the three-dimensional objects 90 by cooperation of the control section 46 of the inkjet printer 20 and the control section 65 of the computer 60. However, at least a part of the functions of the control section 65 of the computer 60 in the present embodiment may be realized by the control section 46 of the inkjet printer 20.

In the present embodiment, the inkjet printer 20 is configured to change the relative positions in the direction shown by the arrow 20c of the recording heads 25 and the three-dimensional objects 90 by the movement of the three-dimensional object supporting device 30 relative to the installing section 21a, which is caused by the movement of the supporting device mounting stage 21c relative to the installing section 21a. However, the inkjet printer 20 may be configured to change the relative positions in the direction shown by the arrow 20c of the recording heads 25 and the three-dimensional objects 90 by the movement of the recording heads 25 relative to the installing section 21a.

The inkjet printer 20 in the present embodiment is a device that prints images by the ultraviolet curable ink, however, it may be a device that prints images by ink other than the ultraviolet curable ink, such as solvent ink or the like.

The invention claimed is:

1. A system for printing on a three-dimensional object, the system comprising:
   a recording head, including a nozzle surface on which a nozzle for discharging ink is formed;
   a three-dimensional object supporting device that supports a three-dimensional object rotatably with a predetermined axis as a center; and
   a print control section that causes the recording head to print an image on the three-dimensional object while rotating the three-dimensional object by the three-dimensional object supporting device,
   wherein the print control section causes the three-dimensional object supporting device to support the three-dimensional object at a designated angle, for each of designated angles that are angles being designated, and causes the recording head to print divided images on the three-dimensional object, the divided images being images that are obtained by dividing a print image being an image to be printed on the three-dimensional object, the divided images being set with respect to the designated angles, and
   the system further comprises:
      an image accepting section that receives the print image; and
      an image dividing section that divides the print image received by the image accepting section in association with the designated angles to set the divided images to the designated angles,
   the recording head moves while discharges ink in a main scanning direction;
   the print control section moves the three-dimensional object supporting device in a direction perpendicular to the nozzle surface, and moves the recording head in a sub scanning direction which is perpendicular to both of the direction perpendicular to the nozzle surface and the main scanning direction;
   the three-dimensional object includes a plurality of surfaces;
   the three-dimensional object supporting device rotatably supports two of the three-dimensional object, and the three-dimensional object supporting device includes a three-dimensional object supporting section for supporting two of the three-dimensional object in a way that predetermined surfaces among the plurality of surfaces of each of one three-dimensional object and the other one three-dimensional object of two of the three-dimensional object are capable of being simultaneously printed without changing angles of two of the three-dimensional object.

2. The system for printing on a three-dimensional object according to claim 1, wherein
   the image dividing section sets the divided images in a state where boundary portions of adjacent divided images are overlapped.

3. The system for printing on a three-dimensional object according to claim 2, wherein
   the image dividing section sets the divided images in a state where a concentration becomes lower towards an end of each of the divided images at the boundary portions.

4. The system for printing on a three-dimensional object according to claim 3, wherein
   in a case of printing the print image on the three-dimensional object, the print control section changes, for each of the designated angles, parallel-direction positions being relative positions of the recording head and the three-dimensional object supporting device in a direction parallel to the nozzle surface, to parallel-direction setting positions being the parallel-direction positions that are set for the designated angle, and
   the system for printing on a three-dimensional object comprises a parallel-direction position setting section that sets the parallel-direction setting positions for the designated angle based on a size of the three-dimensional object inputted from outside, and the designated angle.

5. The system for printing on a three-dimensional object according to claim 2, wherein
   in a case of printing the print image on the three-dimensional object, the print control section changes, for each of the designated angles, parallel-direction positions being relative positions of the recording head and the three-dimensional object supporting device in a direction parallel to the nozzle surface, to parallel-direction setting positions being the parallel-direction positions that are set for the designated angle, and
   the system for printing on a three-dimensional object comprises a parallel-direction position setting section that sets the parallel-direction setting positions for the designated angle based on a size of the three-dimensional object inputted from outside, and the designated angle.

6. The system for printing on a three-dimensional object according to claim 1, wherein
   in a case of printing the print image on the three-dimensional object, the print control section changes, for each of the designated angles, orthogonal-direction positions being relative positions of the recording head and the three-dimensional object supporting device in a direction orthogonally intersecting the nozzle surface, to orthogonal-direction setting positions being the orthogonal-direction positions that are set for the designated angle, and
   the system for printing on a three-dimensional object comprises an orthogonal-direction position setting section that sets the orthogonal-direction setting positions for the designated angle based on a size of the three-dimensional object inputted from outside, and the designated angle.

7. The system for printing on a three-dimensional object according to claim 6, wherein in a case of printing the print image on the three-dimensional object, the print control section changes, for each of the designated angles, parallel-direction positions being relative positions of the recording head and the three-dimensional object supporting device in a direction parallel to the nozzle surface, to parallel-direction setting positions being the parallel-direction positions that are set for the designated angle, and the system for printing on a three-dimensional object comprises a parallel-direction position setting section that sets the parallel-direction setting positions for the designated angle based on a size of the three-dimensional object inputted from outside, and the designated angle.

8. The system for printing on a three-dimensional object according to claim 1, wherein in a case of printing the print image on the three-dimensional object, the print control section changes, for each of the designated angles, parallel-direction positions being relative positions of the recording head and the three-dimensional object supporting device in a direction parallel to the nozzle surface, to parallel-direction setting positions being the parallel-direction positions that are set for the designated angle, and the system for printing on a three-dimensional object comprises a parallel-direction position setting section that sets the parallel-direction setting positions for the designated angle based on a size of the three-dimensional object inputted from outside, and the designated angle.

9. A non-transitory computer readable medium stored with a program for printing on a three-dimensional object that is to be executed by a computer that controls an inkjet printer that is provided with: a recording head including a nozzle surface on which a nozzle for discharging ink is formed; a three-dimensional object supporting device that supports a three-dimensional object rotatably with a predetermined axis as a center; and a print control section that causes the recording head to print an image on the three-dimensional object while rotating the three-dimensional object by the three-dimensional object supporting device, wherein the print control section causes the three-dimensional object supporting device to support the three-dimensional object at a designated angle, for each of designated angles that are angles being designated, and causes the recording head to print divided images on the three-dimensional object, the divided images being images that are obtained by dividing a print image being an image to be printed on the three-dimensional object, the divided images being set with respect to the designated angles, wherein the program causes the computer to function as:
an image accepting section that receives the print image; and an image dividing section that divides the print image received by the image accepting section in association with the designated angles to set the divided images to the designated angles, the recording head moves while discharges ink in a main scanning direction;

the print control section moves the three-dimensional object supporting device in a direction perpendicular to the nozzle surface, and moves the recording head in a sub scanning direction which is perpendicular to both of the direction perpendicular to the nozzle surface and the main scanning direction;

the three-dimensional object includes a plurality of surfaces;

the three-dimensional object supporting device rotatably supports two of the three-dimensional object, and the three-dimensional object supporting device includes a three-dimensional object supporting section for supporting two of the three-dimensional object in a way that predetermined surfaces among the plurality of surfaces of each of one three-dimensional object and the other one three-dimensional object of two of the three-dimensional object are capable of being simultaneously printed without changing angles of two of the three-dimensional object.

\* \* \* \* \*